(12) United States Patent
Centonza et al.

(10) Patent No.: US 9,479,973 B2
(45) Date of Patent: Oct. 25, 2016

(54) NODE AND METHOD FOR HANDING OVER A SUB-SET OF BEARERS TO ENABLE MULTIPLE CONNECTIVITY OF A TERMINAL TOWARDS SEVERAL BASE STATIONS

(71) Applicant: Telefonaktiebolaget L M Ericsson (publ), Stockholm (SE)

(72) Inventors: Angelo Centonza, Winchester (GB); Fredrik Gunnarsson, Linköping (SE); Niklas Johansson, Sollentuna (SE); Oumer Teyeb, Solna (SE); Stefan Wager, Espoo (FI); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 111 days.

(21) Appl. No.: 14/008,936

(22) PCT Filed: Jul. 15, 2013

(86) PCT No.: PCT/SE2013/050904
§ 371 (c)(1),
(2) Date: Sep. 30, 2013

(87) PCT Pub. No.: WO2014/021761
PCT Pub. Date: Feb. 6, 2014

(65) Prior Publication Data
US 2014/0206361 A1 Jul. 24, 2014

Related U.S. Application Data

(60) Provisional application No. 61/678,772, filed on Aug. 2, 2012.

(51) Int. Cl.
*H04W 36/04* (2009.01)
*H04W 36/28* (2009.01)
(Continued)

(52) U.S. Cl.
CPC ...... *H04W 36/0055* (2013.01); *H04W 36/0072* (2013.01); *H04W 36/24* (2013.01); *H04W 76/045* (2013.01); *H04W 36/0027* (2013.01); *H04W 36/04* (2013.01); *H04W 36/28* (2013.01)

(58) Field of Classification Search
CPC ............... H04W 36/04; H04W 36/28; H04W 36/0027; H04W 36/0055; H04W 36/0072; H04W 36/24; H04W 76/045
USPC ......... 455/444, 438; 370/329, 331, 332, 252
See application file for complete search history.

(56) References Cited

U.S. PATENT DOCUMENTS

2009/0170426 A1* 7/2009 Jung et al. ............. 455/7
2009/0186613 A1 7/2009 Ahn et al.
(Continued)

FOREIGN PATENT DOCUMENTS

WO 2010003501 A2 1/2010
WO 2011120559 A1 10/2011

OTHER PUBLICATIONS

Luo, W., et al., "A CoMP soft handover scheme for LTE systems in high speed railway," EURASIP Journal on Wireless Communications and Networking 2012. Jun. 13, 2012. pp. 1-5.
(Continued)

*Primary Examiner* — Nathan Taylor
(74) *Attorney, Agent, or Firm* — Murphy, Bilak & Homiller, PLLC

(57) ABSTRACT

Example embodiments presented herein are directed towards source (401A) and target (401B) base stations, and corresponding methods therein, for providing a handover for a sub-set of bearers associated with a wireless terminal (101) being served by the source base station (401A), wherein at least one bearer of the wireless terminal remains connected to the source base station. The sub-set of bearers is less than or equal to a total number of bearers associated with the wireless terminal.

42 Claims, 16 Drawing Sheets

(51) Int. Cl.
*H04W 36/16* (2009.01)
*H04W 36/00* (2009.01)
*H04W 76/04* (2009.01)
*H04W 36/24* (2009.01)

(56) References Cited

U.S. PATENT DOCUMENTS

| | | |
|---|---|---|
| 2009/0225723 A1* | 9/2009 | Tenneti et al. ............... 370/331 |
| 2010/0062774 A1 | 3/2010 | Motegi et al. |
| 2010/0157944 A1 | 6/2010 | Horn et al. |
| 2010/0265912 A1 | 10/2010 | Mildh et al. |
| 2010/0303039 A1* | 12/2010 | Zhang et al. ................. 370/331 |
| 2010/0304682 A1* | 12/2010 | Choi et al. ................... 455/63.1 |
| 2011/0086639 A1 | 4/2011 | Kalervo Hamalainen et al. |
| 2011/0113299 A1 | 5/2011 | Power et al. |
| 2011/0158121 A1* | 6/2011 | Casati et al. ................. 370/252 |
| 2011/0194462 A1 | 8/2011 | Wu et al. |
| 2011/0207456 A1 | 8/2011 | Radulescu et al. |
| 2011/0268007 A1* | 11/2011 | Barany et al. ............... 370/312 |
| 2011/0274087 A1 | 11/2011 | Liang et al. |
| 2012/0076121 A1 | 3/2012 | Choi et al. |
| 2012/0088505 A1 | 4/2012 | Toh et al. |
| 2012/0100858 A1 | 4/2012 | Qin |
| 2012/0106388 A1 | 5/2012 | Shimezawa et al. |
| 2012/0108240 A1 | 5/2012 | Liu et al. |
| 2012/0165013 A1 | 6/2012 | Nishida et al. |
| 2012/0182912 A1 | 7/2012 | Watfa et al. |
| 2013/0070731 A1 | 3/2013 | Lim et al. |
| 2013/0107863 A1 | 5/2013 | Faccin et al. |
| 2013/0143574 A1* | 6/2013 | Teyeb et al. ................. 455/438 |
| 2013/0170474 A1* | 7/2013 | Bi et al. ....................... 370/332 |
| 2013/0176853 A1 | 7/2013 | Mahr |
| 2013/0201904 A1 | 8/2013 | Toskala et al. |
| 2013/0260811 A1 | 10/2013 | Rayavarapu et al. |
| 2013/0272268 A1 | 10/2013 | Xu et al. |
| 2013/0322325 A1 | 12/2013 | Hahn et al. |
| 2013/0337812 A1 | 12/2013 | Pekonen et al. |
| 2014/0211619 A1 | 7/2014 | Suryavanshi et al. |
| 2014/0213264 A1 | 7/2014 | Park et al. |
| 2014/0219248 A1* | 8/2014 | Reddiboyana et al. ...... 370/331 |
| 2014/0357274 A1 | 12/2014 | Teng et al. |

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29.274 V11.3.0, Jun. 2012, 1-219.

3GPP, "3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.2.0, Jun. 2011, 1-253.

\* cited by examiner

NODE AND METHOD FOR HANDING OVER A SUB-SET OF BEARERS TO ENABLE MULTIPLE CONNECTIVITY OF A TERMINAL TOWARDS SEVERAL BASE STATIONS

TECHNICAL FIELD

Example embodiments presented herein are directed towards source and target base stations, and corresponding methods therein, for providing a handover for a sub-set of bearers associated with a wireless terminal being served by the source base station, wherein at least one bearer of the wireless terminal remains connected to the source base station. The sub-set of bearers is less than or equal to a total number of bearers associated with the wireless terminal.

BACKGROUND

With the proliferation of user friendly smart phones and tablets, the usage of high data rate services such as video streaming over the mobile network is becoming common place, greatly increasing the amount of traffic in mobile networks. Thus, there is a great urgency in the mobile network community to ensure that the capacity of mobile networks keeps increasing along with the ever-increasing user demand. The latest systems such as Long Term Evolution (LTE), especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks where the traditional preplanned macro base stations (known as the macro layer) are complemented with several low-powered base stations that may be deployed in a relatively unplanned manner. The 3rd Generation Partnership Project (3GPP) has incorporated the concept of Heterogeneous Networks as one of the core items of study in the latest enhancements of LTE, such as LTE release 11 and several low-powered base stations for realizing heterogeneous networks such as pico base stations, femto base stations (also known as home base stations or HeNBs), relays, and RRHs (remote radio heads) have been defined. The initial discussion for LTE release 12 has already started and one of the proposed items for study is the possibility of serving a user equipment (UE) from more than one eNB simultaneously. The current legacy handover mechanisms of LTE have to be updated in order to support this.

FIG. 1 provides an example of a heterogeneous network where a mobile terminal 101 uses multiple flows, e.g. an anchor flow from the macro base station (or "anchor eNB") 401A and a assisting flow from a pico base station (or a "assisting eNB") 401B. One of the problems in using a heterogeneous network is how to map the user plane bearers on the anchor flow and assisting flow, respectively. The simple solution is that each bearer is mapped on a single flow, for example, the first bearer uses the anchor flow and the second bearer uses the assisting flow.

SUMMARY

When using a single flow for mapping bearers in a heterogeneous network, several problems exists. An example of such a problem is the need for frequent handovers. In order to keep the user data throughput on acceptable levels, the user plane bearer may need to be "handed over" frequently from the assisting flow to the anchor flow or vice versa, depending on radio link conditions and the speed of the mobile terminal. Furthermore, each handover introduces signaling between the network and the mobile terminal and also within the network. With many mobile terminals and pico base stations, the signaling load in the network nodes may become considerate and possibly a limiting factor.

Additionally, during this handover of a user plane bearer, an inevitable "glitch" is introduced in the data flow, since data packets cannot be transmitted during the handover procedure duration. The data flow needs to be routed via the target base station instead of the source base station. Data that resides in the source base station can be forwarded to the target base station via an inter-site interface such as X2. Even though packets eventually will reach the mobile, some services such as real time services that rely on somewhat regular packet transmissions will however be impacted. Hence, frequent handovers for a given mobile terminal may thus have an impact on at least real time services.

Thus, at least one example object of some of the example embodiments presented herein is to provide an efficient means of mapping bearers in a heterogeneous network. According to some of the example embodiments, an optimized approach to handover that takes advantage of multiple connectivity of a user equipment to several eNBs, where the handover can be triggered and/or executed at a bearer level rather than the current user equipment level approach that is used in LTE is proposed. Different handover triggering conditions can be set, and based on these conditions as well as other factors such as load and user equipment/network buffer conditions; a selective handover of only a subset of the user equipment bearers is performed.

The example embodiments discussed herein make it possible to perform handovers selectively between a source and a target eNB, thereby creating more system flexibility than the legacy way of performing handover where a user equipment is completely handed over to the target. At least one example advantage of some of the example embodiments presented herein is the possibility to keep all the user equipment bearers ongoing as the bearers that the target was not able to admit may be kept at the source.

Another example advantage is the possibility to trigger handover at a bearer level rather than at a user equipment level. For example, the source eNB may keep the bearers that can't tolerate discontinuity such as VoIP services with itself until the radio conditions of the source are at much lower quality than the target, while bearers that are very capacity hungry but more tolerant to interruptions such as file download may be handed over to the target even if the radio conditions at the source are not that bad.

A further example advantage is the possibility to maintain control plane at one eNB, while sharing the data load at several eNBs. This opens several opportunities such as network sharing. For example, several operators can share the pico nodes for data bearers, while maintaining the signaling radio bearers only at their macros.

Another example advantage is control plane diversity, such as sending of handover command from the source and/or targets or sending of the measurement report towards targets becomes rather straightforward with multiple connectivity.

Yet a further example advantage is RLF on the assisting or anchor node may be recovered faster. Assisting recovery is straightforward as the user equipment context resides at the anchor, and anchor recovery also becomes fast as the assisting may fetch the context easily from the network.

Accordingly, some of the example embodiments are directed towards a method, in a source base station, for providing a handover for a sub-set of bearers associated with a wireless terminal being served by the source base station. The sub-set of bearers is less than or equal to all bearers associated with the wireless terminal. The source base station is comprised in a wireless communications network. The method comprises determining a need for a handover procedure. The method also comprises selecting the sub-set of bearers associated with the wireless terminal. The method further comprises sending, to a target base station, a handover request for the sub-set of bearers, wherein at least one bearer of the wireless terminal remains connected to the source base station.

Some of the example embodiments are directed towards a source base station for providing a handover for a sub-set of bearers associated with a wireless terminal being served by the source base station. The sub-set of bearers is less than or equal to all bearers associated with the wireless terminal. The source base station is comprised in a wireless communications network. The source base station comprises processing circuitry configured to determine a need for a handover procedure. The processing circuitry is further configured to select the sub-set of bearers associated with the wireless terminal. The source base station further comprises radio circuitry configured to send, to a target base station, a handover request for the sub-set of bearers, wherein at least one bearer of the wireless terminal remains connected to the source base station.

Some of the example embodiments are directed towards a method, in a target base station, for providing a handover for a sub-set of bearers associated with a wireless terminal being served by a source base station. The sub-set of bearers is less than or equal to all bearers associated with the wireless terminal. The target base station is comprised in a wireless communications network. The method comprises receiving, from the source base station, a handover request for the sub-set of bearers, wherein at least one bearer of the wireless terminal remains connected to the source base station. The method further comprises analyzing an admissibility of the sub-set of bearers with respect to the handover procedure. The method also comprises sending, to the source base station, a handover acknowledgement message comprising a result of the analyzing.

Some of the example embodiments are directed towards a target base station for providing a handover for a sub-set of bearers associated with a wireless terminal being served by a source base station. The sub-set of bearers is less than or equal to all bearers associated with the wireless terminal. The target base station is comprised in a wireless communications network. The target base station comprises radio circuitry configured to receive, from the source base station, a handover request for the sub-set of bearers, wherein at least one bearer of the wireless terminal remains connected to the source base station. The target base station further comprises processing circuitry configured to analyze an admissibility of the sub-set of bearers with respect to the handover procedure. The radio circuitry is further configured to send, to the source base station, a handover acknowledgement message comprising a result of the analyzed admissibility.

DEFINITIONS

3GPP 3rd Generation Partnership Project
AMBR Aggregate Maximum Bit Rate
AP Application Protocol
APN Access Point Name
ARP Allocation and Retention Priority
ARQ Automatic Repeat reQuest
BCH Broadcast Channel
CIO Cell Individual Offset
CN Core Network
CRS Cell specific Reference Symbol
CSG Closed Subscriber Group
DL Downlink
DM Demodulation
DRB Data Radio Bearer
E-RAB E-UTRAN Radio Access Bearers
E-UTRA Evolved Universal Terrestrial Radio Access
E-UTRAN Evolved UMTS Terrestrial Radio Access Network
eNB/eNodeB enhanced Node B(base station)
EPC Evolved Packet Core
EPS Evolved Packet System
EMM Evolved Packet System Connection Management
GBR Guaranteed Bit Rate
GUMMEI Globally Unique Mobility Management Entity Identifier
HARQ Hybrid Automatic Repeat reQuest
HeNB Home eNB
HO Handover
HOM Handover Margin
HSPA High-Speed Packet Access
IE Information Element
ID Identity
IP Internet Protocol
LTE Long Term Evolution
MAC Medium Access Control
MBR Maximum Bit Rate
MME Mobility Management Entity
MTCP Multi-path Transmission Control Protocol
NAS Non-Access Stratum
OAM Operation and Maintenance
PGW PDN Gateway
PBCH Physical Broadcast CHannel
PCell Primary Cell
PCFICH Physical Control Format Indicator CHannel
PCI Physical Cell Identity
PDCCH Physical Downlink Control CHannel
PDCP Packet Data Convergence Protocol
PDN Packet Data Network
PDSCH Physical Downlink Shared CHannel
PDU Packet Data Unit
PHICH Physical Hybrid ARQ Indicator CHannel
PSS Primary Synchronization Signal
QCI QoS Class Identifier
QoS Quality of Service
RLC Radio Link Control
RAB Radio Access Bearer
RAT Radio Access Technology
RE Resource Element
RLC Radio Link Control
RLF Radio Link Failure
RRC Radio Resource Control
RRH Remote Radio Head
RRM Radio Resource Management
RS Reference Signal
RSCP Received Signal Code Power
RSRP Reference Signal Received Power
RSRQ Reference Signal Received Quality
Rx Receive
SGW Serving Gateway SCell Secondary Cell
SCTP Stream Control Transmission Protocol
SDF Service Data Flow
SDU Service Data Unit
SFN System Frame Number
SINR Signal to Interference plus Noise Ratio
SRB Signaling Radio Bearer
SRVCC Single Radio Voice Call Continuity
SSS Secondary Synchronization Signal
TCP Transmission Control Protocol
TTT Time To Trigger
Tx Transmit
UE User Equipment
UL Uplink
UMTS Universal Mobile Telecommunications System
UTRA Universal Terrestrial Radio Access
UTRAN Universal Terrestrial Radio Access Network
VoIP Voice over Internet Protocol

BRIEF DESCRIPTION OF THE DRAWINGS

The foregoing will be described in more detail with from the following more particular description of the example embodiments, as illustrated in the accompanying drawings in which like reference characters refer to the same parts throughout the different views.

The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.

General Overview

Figure 1:
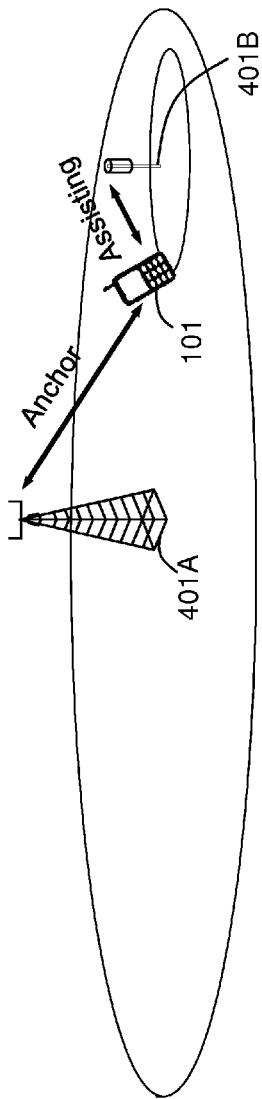
FIG. 1 is an illustrative example of a heterogeneous deployment with simultaneous anchor and assisting flows to a wireless terminal.
Figure 2:
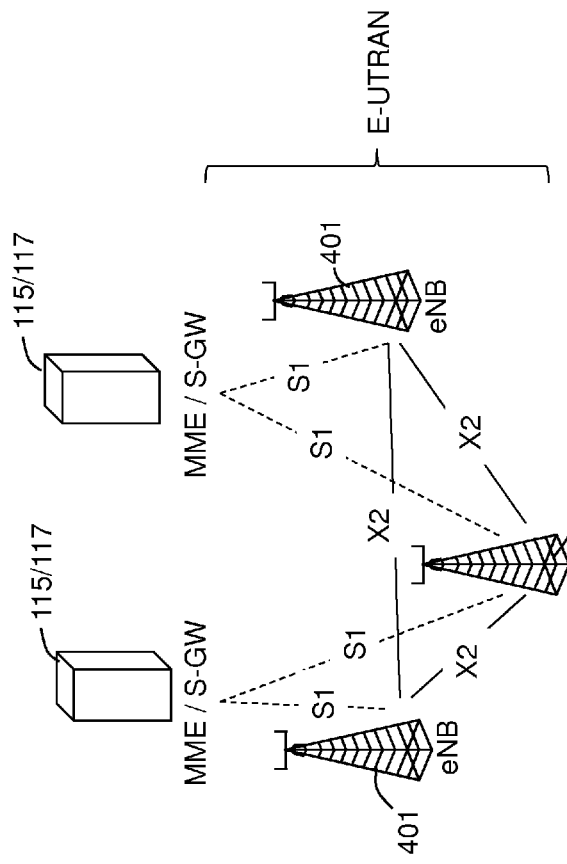
FIG. 2 is an illustrative example of E-UTRAN architecture.

In order to better explain the example embodiments presented herein, a problem will first be identified and discussed. The Evolved UMTS Terrestrial Radio Access Network (E-UTRAN) comprise base stations 401 called enhanced NodeBs (eNBs or eNodeBs), providing the E-UTRA user plane and control plane protocol terminations towards the user equipment. The base stations or eNBs 401 are interconnected with each other by means of the X2 interface. The eNBs 401 are also connected by means of the S1 interface to the EPC (Evolved Packet Core), more specifically to the MME (Mobility Management Entity) 115 by means of the S1-MME interface and to the Serving Gateway (SGW) 117 by means of the S1-U interface. The S1 interface supports many-to-many relation between MMEs/SGWs and eNBs. The E-UTRAN architecture is illustrated in FIG. 2.

The eNB 401 hosts functionalities such as Radio Resource Management (RRM), radio bearer control, admission control, header compression of user plane data towards serving gateway, routing of user plane data towards the serving gateway. The MME 115 is the control node that processes the signaling between the user equipment and the CN. The main functions of the MME 115 are related to connection management and bearer management, which are handled via Non Access Stratum (NAS) protocols. The SGW 117 is the anchor point for user equipment mobility, and also comprises other functionalities such as temporary DL data buffering while the user equipment 101 is being paged, packet routing and forwarding the right eNB, gathering of information for charging and lawful interception. The PDN Gateway (PGW) 119 is the node responsible for user equipment IP address allocation, as well as Quality of Service (QoS) enforcement (this is explained further in later sections).

Figure 3:
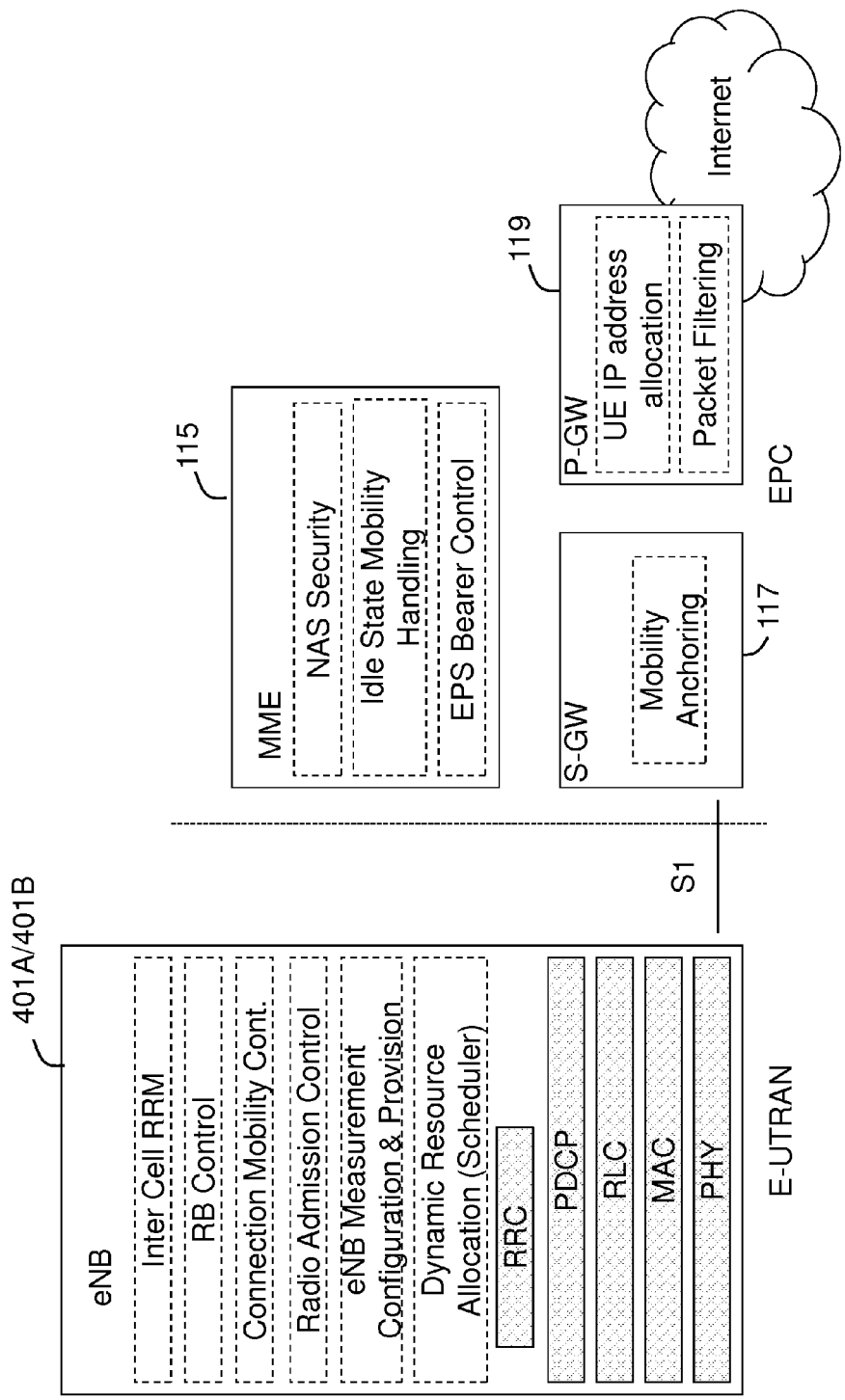
FIG. 3 is a schematic depicting the functional split between E-UTRAN and EPC.

FIG. 3 gives a summary of the functionalities of the different nodes, referred to in 3GPP TS 36.300 and the references therein providing the details of the functionalities of the different nodes. In FIG. 3, the solid lined boxes depict the logical nodes, dashed boxes depict the functional entities of the control plane and cross-hatched boxes depict the radio protocol layers.

Radio Protocol Architecture

Figure 4:
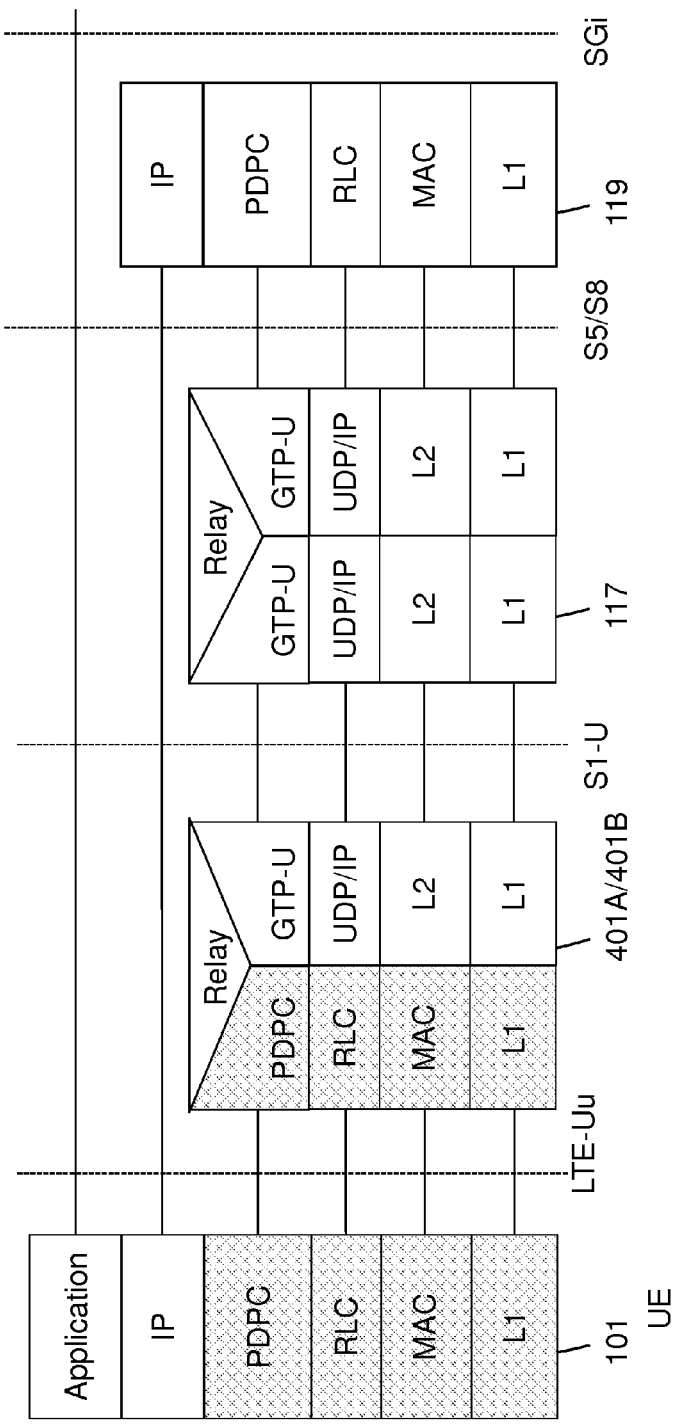
FIG. 4 is a user plane protocol stack.

The radio protocol architecture of E-UTRAN is divided into the user plane and the control plane. FIG. 4 shows the protocol stack for the user-plane. The user plane protocol stack is comprised of the Packet Data Convergence Protocol (PDCP), Radio Link Control (RLC), and Medium Access Control (MAC), which are terminated at the eNB 401. The PDCP manages IP packets in the user plane and it performs functionalities such as header compression, security, and re-ordering and retransmission during handover. The RLC layer is mainly responsible for segmentation (and corresponding assembly) of PDCP packets, in order that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS of each radio bearer and the current capacity available to the user equipment 101.

Figure 5:
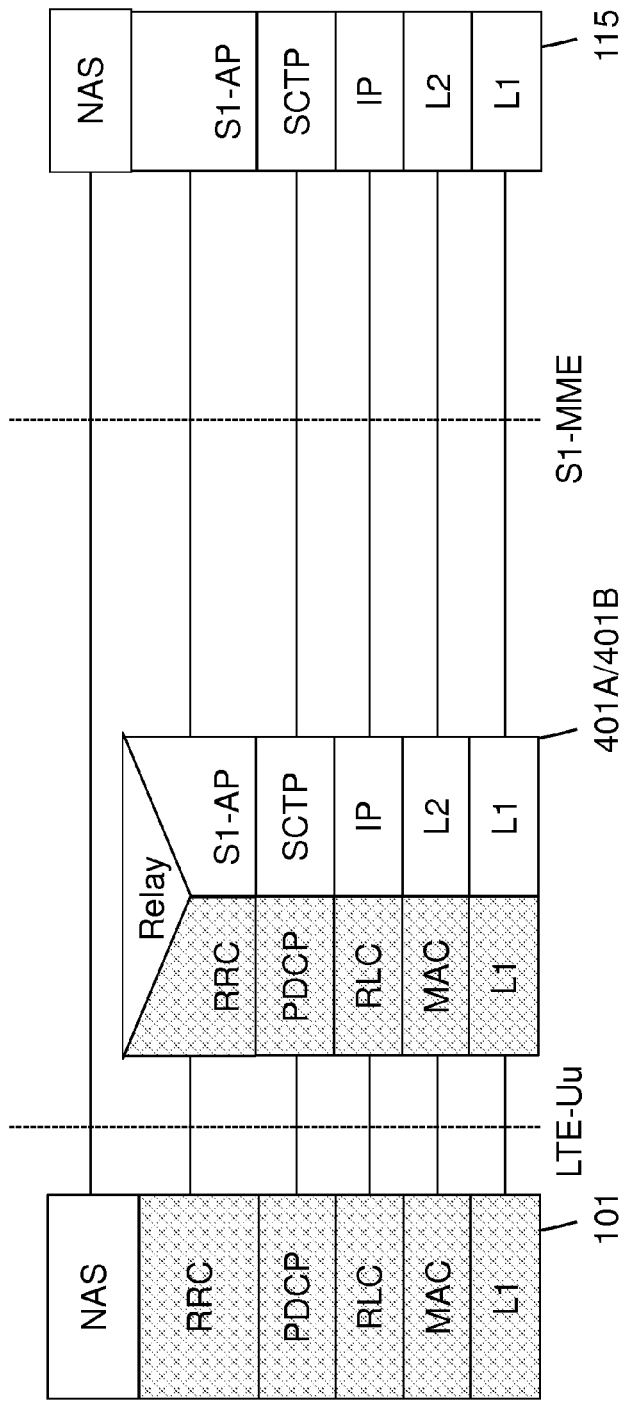
FIG. 5 is a control plane protocol stack.

FIG. 5 shows the control plane protocol stack. The layers below the Radio Resource Control (RRC) layer perform the same functionality as in the user plane except that there is no header compression in the control plane. The main functions of the RRC are the broadcasting of system information, RRC connection control (establishment, modification, and release of RRC connection, establishment of signaling radio bearers (SRB) and data radio bearers (DRBs), handover, configuration of lower protocol layers, radio link failure recovery, etc.), and measurement configuration and reporting. The details of the RRC protocol functionalities and procedures may be found in 3GPP TS 36.331.

A user equipment or wireless terminal 101 in general is uniquely identified over the S1 interface within an eNB 401 with the eNB UE S1AP ID. When an MME 115 receives an eNB UE S1AP ID it stores it for the duration of the user equipment associated logical S1-connection for this user equipment 101. Once known to an MME 115 this IE is comprised in all user equipment associated S1-AP signaling. The eNB UE S1AP ID is unique within the eNB 401, and user equipments are assigned new S1AP ID after a handover by the target eNB.

From the MME side, a user equipment 101 is uniquely identified using the MME UE S1AP ID. When an eNB 401 receives an MME UE S1AP ID it stores it for the duration of the user equipment-associated logical S1 connection for this user equipment 101. Once known to an eNB 401 this IE is comprised in all user equipment associated 51-AP signaling. The MME UE S1AP ID is unique within the MME 115, and it is changed if the user equipment's MME changes, for example, handover between two eNBs connected to different MMEs.

Figure 6:
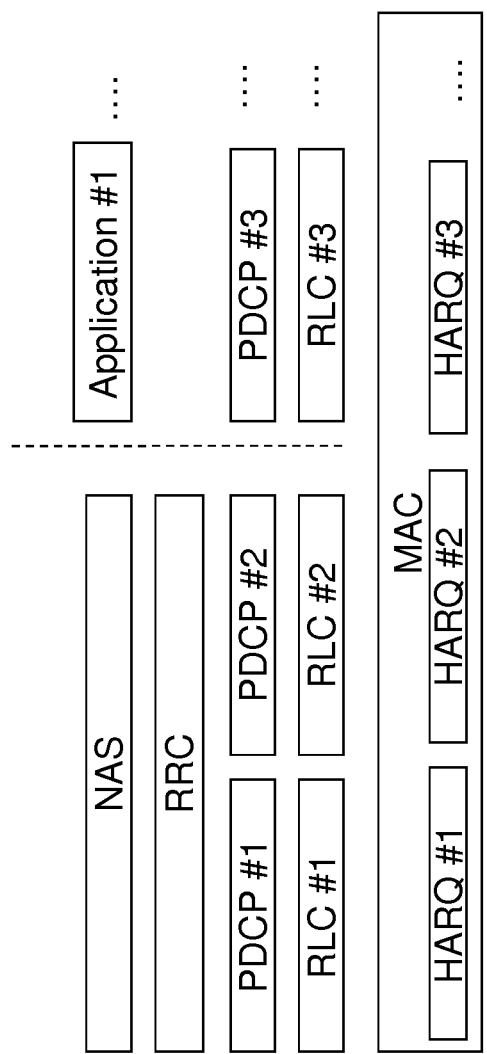
FIG. 6 is a user plane and control plane data flow.

The flow of user plane and control plane data is illustrated in FIG. 6. There is only one MAC entity per user equipment 101 (unless the user equipment supports multiple carriers as in the case of carrier aggregation) and under this MAC entity, several Hybrid ARQ (HARQ) processes might be running simultaneously for rapid retransmissions. There is a separate RLC entity for each radio bearer and if the radio bearer is configured to use PDCP, there is also one separate PDCP entity for that bearer. A bearer is configured to use PDCP only if it is dedicated to a user equipment (i.e., multicast and broadcast data do not utilize PDCP both in the control and user plane and the PDCP is used only for dedicated control message in the control plane and for dedicated UL/DL data in the user plane).

At the transmitting side each layer receives a Service Data Unit (SDU) from a higher layer, and sends a Protocol Data Unit (PDU) to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed, i.e. each layer passing SDUs to the layer above it, where they are perceived as PDUs.

Quality of Service

A user equipment 101 may have multiple applications running at the same time, each having different QoS requirements, for example, VoIP, browsing, file download, etc. In order to support these different requirements, different bearers are set up, each being associated with a QoS. An EPS bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g., scheduling policy, queue management policy, rate shaping policy, RLC configuration, etc.).

One EPS bearer/E-RAB is established when the user equipment 101 connects to a PDN, and that remains established throughout the lifetime of the PDN connection to provide the user equipment 101 with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer may only be taken by the EPC, and the bearer level QoS parameter values are always assigned by the EPC.

An EPS bearer/E-RAB is referred to as a GBR bearer if dedicated network resources related to a Guaranteed Bit Rate (GBR) value that is associated with the EPS bearer/E-RAB are permanently allocated (e.g., by an admission control function in the eNB) at bearer establishment/modification. Otherwise, an EPS bearer/E-RAB is referred to as a Non-GBR bearer. A dedicated bearer may either be a GBR or a Non-GBR bearer while a default bearer shall be a Non-GBR bearer.

Figure 7:
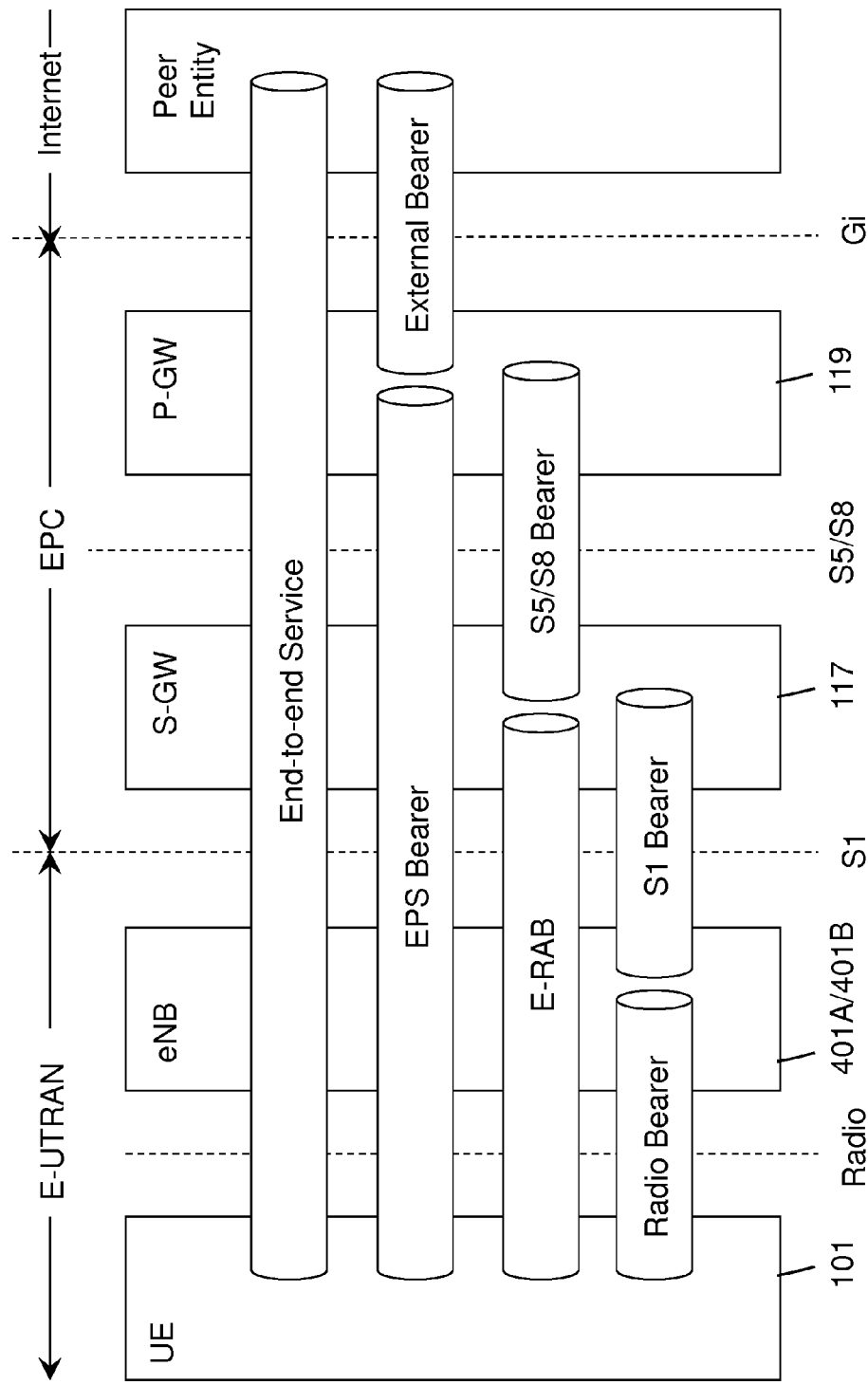
FIG. 7 is an illustrative example of bearer service architecture.

The EPS bearer service architecture is shown in FIG. 7. The packets of an EPS bearer are transported over a radio bearer between the user equipment 101 and eNB 401. An S1 bearer transports the packets of an EPS bearer between the eNB 401 and SGW 117. An E-RAB is actually a concatenation of these two bearers (i.e., radio bearer and S1 bearer), and the two bearers are mapped on a one to one fashion. An S5/S8 bearer transports the packets of the EPS bearer between the SGW 117 and PGW 119, and completes the EPS bearer. Here also there is a one to one mapping between the E-RAB and S5/S8 bearer.

The bearer level (i.e., per bearer or per bearer aggregate) QoS parameters are QCI, ARP, GBR, and AMBR. Each EPS bearer/E-RAB (GBR and Non-GBR) is associated with the following bearer level QoS parameters: QCI and ARP. QoS Class Identifier (QCI) is a scalar that is used as a reference to access node-specific parameters that control bearer level packet forwarding treatment (e.g., scheduling weights, admission thresholds, queue management thresholds, link layer protocol configuration, etc.), and that has been preconfigured by the operator owning the eNodeB 401. The QCI may also be used to reference node-specific parameters that control bearer level packet forwarding treatment in the other nodes in the user plain chain, for example, the PGW 119 and the SGW 117. Nine QCI values are standardized, the detailed requirements of these classes may be found in 3GPP TS 23.203. Allocation and Retention Priority (ARP) is used to decide whether a bearer establishment/modification request may be accepted or needs to be rejected in case of resource limitations. In addition, the ARP may be used by the eNodeB 401, SGW 117 or PGW 119 to decide which bearer(s) to drop during exceptional resource limitations (e.g., at handover).

Each GBR bearer is additionally associated with the bearer level QoS parameters GBR and MBR. Guaranteed Bit Rate (GBR) is the bit rate that may be expected to be provided by a GBR bearer. Maximum Bit Rate (MBR) is the maximum bit rate that may be expected to be provided by a GBR bearer. MBR can be greater or equal to the GBR.

Each APN access, by a user equipment 101, is associated with a per-APN Aggregate Maximum Bit Rate (APN-AMBR). The APN-AMBR sets the limit on the aggregate bit rate that may be expected to be provided across all Non GBR bearers and across all PDN connections of the same APN. Each user equipment 101 in state EMM-REGISTERED is associated with the bearer aggregate level QoS parameter known as per user equipment Aggregate Maximum Bit Rate (UE-AMBR). The UE AMBR limits the aggregate bit rate that may be expected to be provided across all Non GBR bearers of a user equipment 101.

Heterogeneous Networks and Soft/Shared Cells

Figure 8:
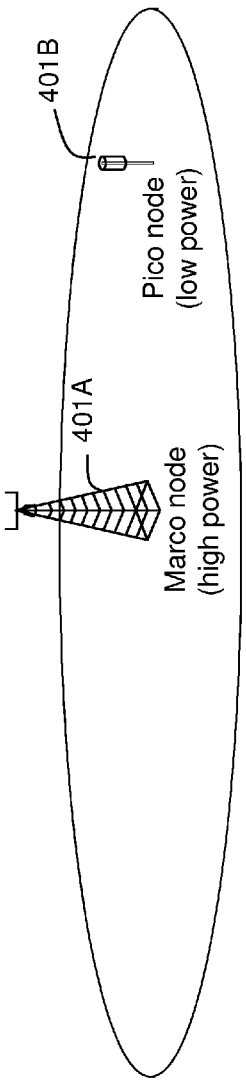
FIG. 8 is an illustrative example of a heterogeneous deployment with a higher-power macro node and a lower-power pico node.

The use of a so called heterogeneous deployment or heterogeneous network, as illustrated in FIG. 8, comprising network transmission nodes with different transmit power operating and with overlapping coverage areas, is considered to be an interesting deployment strategy for cellular networks. In such a deployment, the low-power nodes ("pico nodes"), which may be utilized as assisting base stations 401B, are typically assumed to offer high data rates (Mbit/s), as well as provide high capacity (users/m2 or Mbit/s/m2), in the local areas where this is needed/desired, while the high-power nodes ("macro nodes"), which may be utilized as anchor base stations 401A, are assumed to provide full-area coverage. In practice, the macro nodes 401A may correspond to currently deployed macro cells while the pico nodes 401B are later deployed nodes, extending the capacity and/or achievable data rates within the macro-cell coverage area where needed.

Figure 9:
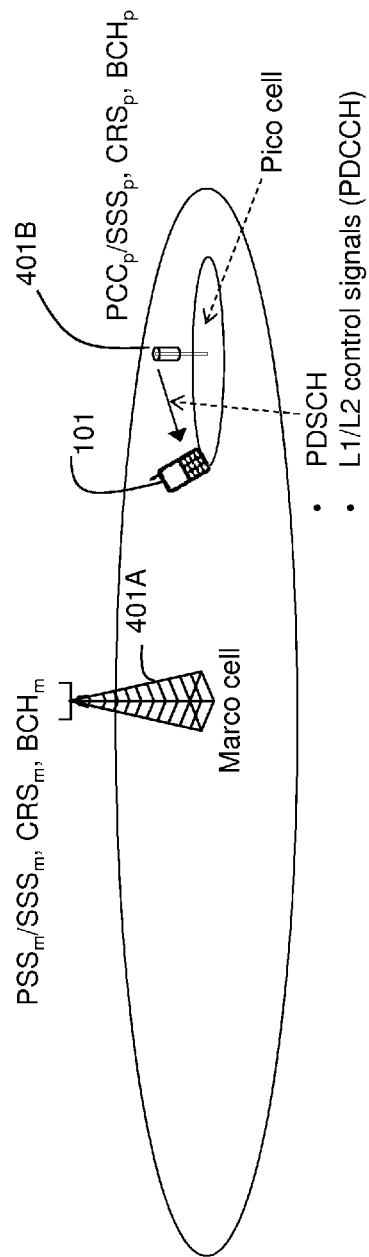
FIG. 9 is an illustrative example of a heterogeneous deployment where the pico node corresponds to a cell of its own.

A pico node 401B of a heterogeneous deployment may correspond to a cell of its own (a "pico cell"), as illustrated in FIG. 9. This means that, in addition to downlink and uplink data transmission/reception, the pico node also transmits the full set of common signals/channels associated with a cell. In the LTE context this comprises Primary and Secondary Synchronization Signals (PSS and SSS) corresponding to the Physical Cell Identity of the pico cell. Also comprised are Cell-specific reference signals (CRS), also corresponding to the Physical Cell Identity of the cell. The CRS may, for example, be used for downlink channel estimation to enable coherent demodulation of downlink transmissions. Further comprised is the Broadcast channel (BCH), with corresponding pico-cell system information.

As the pico node 401B transmits the common signals/channels, the corresponding pico cell may be detected and selected (e.g., connected to) by a terminal (UE, user equipment) 101. If the pico node 401B corresponds to a cell of its own, also so-called L1/L2 control signaling on the PDCCH (as well as PCFICH and PHICH) are transmitted from the pico node to connected terminals, in addition to downlink data transmission on the PDSCH. The L1/L2 control signaling, for example, provides downlink and uplink scheduling information and Hybrid-ARQ-related information to terminals within the cell. This is shown in FIG. 9.

Figure 10:
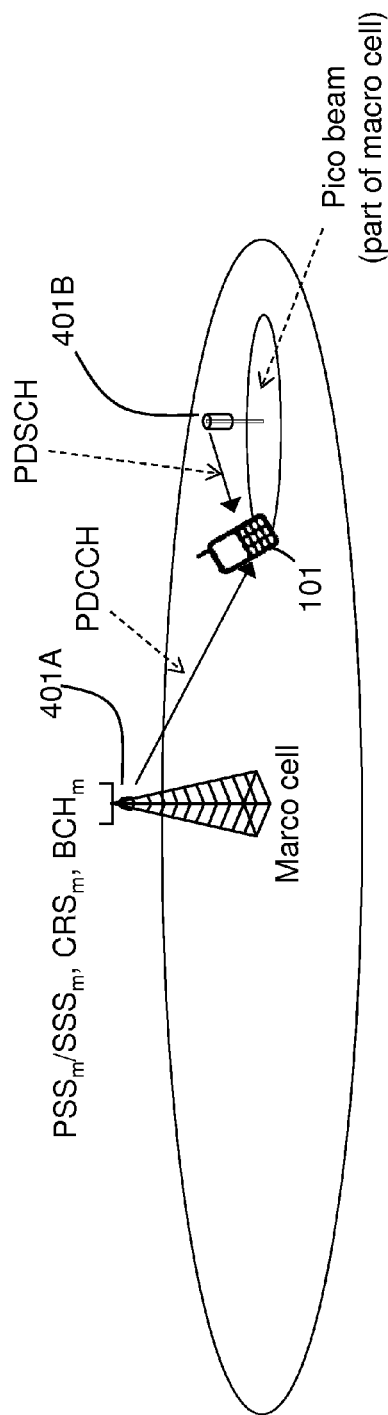
FIG. 10 is an illustrative example of a heterogeneous deployment where the pico node does not correspond to a cell of its own.

Alternatively, a pico node 401B within a heterogeneous deployment may not correspond to a cell of its own but may just provide a data-rate and capacity "extension" of the overlaid macro cell 401A. This is sometimes known as "shared cell" or "soft cell". In this case at least the CRS, PBCH, PSS and SSS are transmitted from the macro node 401A. The PDSCH may be transmitted from the pico node 401B. To allow for demodulation and detection of the PDSCH, despite the fact that no CRS is transmitted from the pico node 401B, DM-RS should be transmitted from the pico node 401B together with the PDSCH. The user equipment-specific reference signals may then be used by the terminal for PDSCH demodulation/detection. This is shown in FIG. 10.

Figure 11:
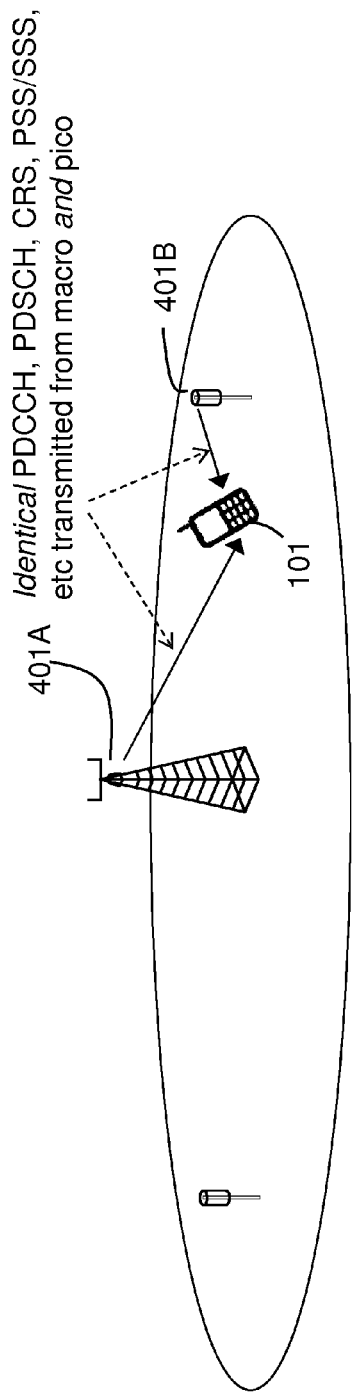
FIG. 11 is a depiction of SFN operation with identical transmission from macro and pico to a terminal.

Transmitting data from a pico node 401B not transmitting CRS as described above requires DM-RS support in the terminal ("non-legacy terminal"). In LTE, DM-RS-based PDSCH reception is supported in Rel-10 and for FDD while for the L1/L2 control signaling, DM-RS-based reception is planned for Rel-11. For terminals not supporting DM-RS-based reception ("legacy terminals") one possibility in a shared cell setting is to exploit $SFN^2$-type of transmission. In essence identical copies of the signals and channels necessary for a legacy terminal are transmitted simultaneously from the macro 401A and pico 401B nodes. From a terminal perspective this will look as a single transmission. Such an operation, which is illustrated in FIG. 11, will only provide an SINR gain. This may be translated into a higher data rate, but not a capacity improvement, as transmission resources cannot be reused across sites within the same cell.

Figure 12:
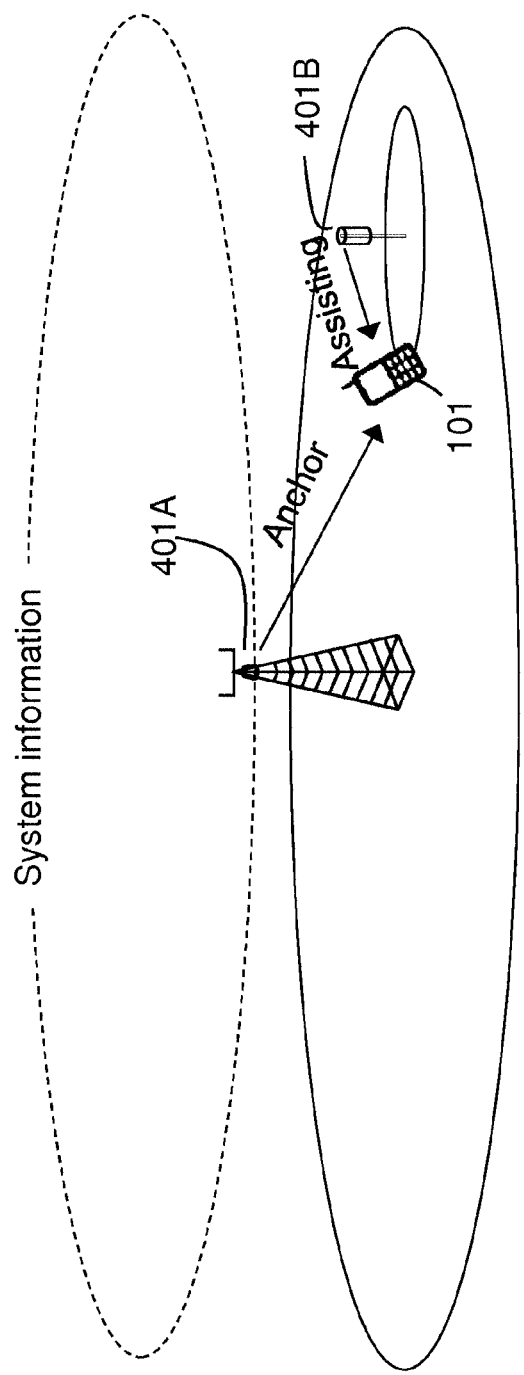
FIG. 12 is a depiction of soft cell operation with the wireless terminal having multiple connections with both the anchor and assisting base stations.

It may be assumed that the macros 401A are able to provide coverage and the picos 401B are there only for capacity enhancements (i.e., no coverage holes), another alternative architecture is where the user equipment maintains the macro connectivity all the time (called the "anchor" flow), and adds the pico connectivity when it is in the coverage area of the pico (called the "assisting" flow). When both connections are active, the anchor flow may be used either for control signaling while the assisting flow is used for data. However, it will still be possible to send data also via the anchor flow. We define this case as "multiple connectivity" or "dual connectivity". This is illustrated in FIG. 12. Note that in this case, as in the previous cases, the system information is shown to be sent only from the macro 401A, but it is still possible to send it also from the picos 401B.

Protocol Architecture for Soft Cells

Figure 13:
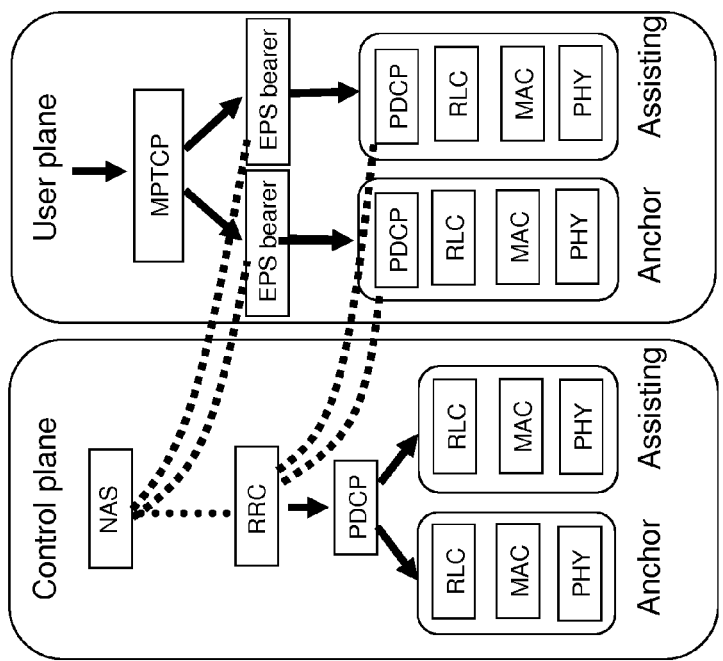
FIG. 13 is an illustrative example of protocol architecture for multiple or dual connectivity.

In order to support multiple connectivity, several architectural options are possible both for the control and user plane. For the user plane, we can have a centralized approach where the PDCP (or even the RLC) is terminated at the anchor only and the assisting node terminates at the RLC (or even the MAC) level. A decentralized approach will be to have the assisting node to terminate at the PDCP level. A similar approach may be taken in the control plane, for example, distributed or centralized PDCP/RLC, but on top of that we have the additional dimension of centralizing or distributing the RRC. FIG. 13 shows example control and user plane architectures, where the user plane is employing distributed PDCP, while the control plane is centralized at the PDCP level at the anchor. Note that in the figure, user plane aggregation, for example, the possibility to split the packets belonging to one application data flow over the anchor and assisting links, may be realized by using a higher layer aggregation protocol like multi-path TCP (MTCP).

User Equipment Measurements

User equipments may be configured to report measurements, mainly for the sake of supporting mobility. As specified in 3GPP TS 36.331, the E-UTRAN provides the measurement configuration applicable for a user equipment in RRC_CONNECTED by means of dedicated signaling, for example, using the RRCConnectionReconfiguration message.

Various measurement configurations may be signaled to the user equipment. An example of such a measurement configuration is measurement objects. Measurement objects define on what the user equipment should perform the measurements on, for example, a carrier frequency. The measurement object may also comprise a list of cells to be considered (white-list or black-list) as well as associated parameters, for example, frequency- or cell-specific offsets.

Another example of a measurement configuration is a reporting configuration. Reporting configurations comprise periodic or event-triggered criteria which cause the user equipment to send a measurement report, as well as the details of what information the user equipment is expected to report. The information to be reported may comprise quantities such as, for example, Received Signal Code Power (RSCP) for UMTS or Reference Signal Received Power (RSRP) for LTE, and the number of cells.

Another example configuration may be measurement identities. Measurement identities identify a measurement and define the applicable measurement object and reporting configuration. Each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

A further configuration example is quantity configurations. Quantity configurations define the filtering to be used on each measurement. One quantity configuration is configured per RAT type, and one filter can be configured per measurement quantity.

Yet another example configuration is measurement gaps. Measurement gaps define time periods when no uplink or downlink transmissions will be scheduled, so that the user equipment may perform the measurements, for example, inter-frequency measurements where the user equipment has only one Tx/Rx unit and supports only one frequency at a time. The measurement gaps configuration are common for all gap-assisted measurements.

The E-UTRAN configures only a single measurement object for a given frequency, but more than one measurement identity may use the same measurement object. The identifiers used for the measurement object and reporting configuration are unique across all measurement types. It is possible to configure the quantity which triggers the report (RSCP or RSRP) for each reporting configuration.

In LTE, some examples of measurement metrics used are the Reference Signal Received Power (RSRP) and Reference Signal Received Quality (RSRQ). RSRP is a cell specific measure of signal strength and it is mainly used for ranking different cells for handover and cell reselection purposes, and it is calculated as the linear average of the power of the Resource Elements (REs) which carry cell-specific Reference Signals (RSs). The RSRQ, on the other hand, also takes the interference into consideration by taking the total received wideband power into account as well.

One of the measurement configuration parameters that user equipments receive from their serving eNBs is the S-measure. The S-measure tells the user equipment when to start measuring neighboring cells. If the measured RSRP of the serving cell falls below the S-measure, indicating the signal of the serving cell is not that strong anymore, the user equipment starts measuring the signal strength of RSs from the neighboring cells. The S-measure is an optional parameter and different S-measure values may be specified for initiating intra-frequency, inter-frequency and inter-RAT measurements. Once the user equipment is enabled for measuring, it may report the serving cell, listed cells (i.e. cells indicated as part of the measurement object), and/or detected cells on a listed frequency (i.e. cells which are not listed cells but are detected by the user equipment).

There are several measurement configuration parameters that specify the triggering of measurement reports from the user equipment. An example of event-triggered criteria, which is specified for intra-RAT measurement reporting in LTE, is Event A1. Event A1 triggers when the Primary serving cell, PCell becomes better than an absolute threshold. Another example is Event A2, which triggers when the PCell becomes worse than the absolute threshold. A further example is Event A3, which triggers when the neighbor cell becomes better than an offset relative to the PCell. A further example is Event A4, which triggers when the neighbor cell becomes better than the absolute threshold. Yet another example is Event A5, which triggers when the PCell becomes worse than one absolute threshold and the neighbor cell becomes better than another absolute threshold. Another example is Event A6, which triggers when the neighbor cell becomes better than an offset relative to a secondary cell (SCell).

Various event-triggered reporting criteria are specified for inter-RAT mobility. An example is Event B1, which triggers when the neighbor cell becomes better than an absolute threshold. A further example is Event B2, which triggers when the serving cell becomes worse than one absolute threshold and a neighbor cell becomes better than another absolute threshold.

Figure 14:
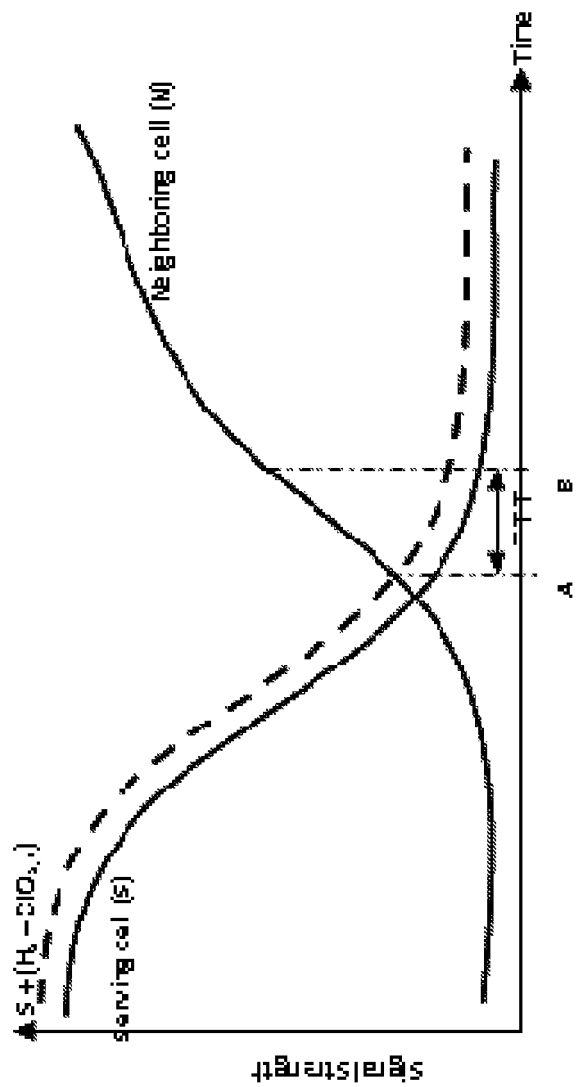
FIG. 14 is an illustrative example of handover triggering.

An example of a measurement report triggering event related to handover is A3, and its usage is illustrated in FIG. 14. The triggering conditions for event A3 can be formulated as:

$$N > S + HOM \qquad (1)$$

where N and S are the signal strengths of the neighbor and serving cells, respectively, and HOM is the handover margin. HOM is the difference between the radio quality of the serving cell and the radio quality needed before attempting a handover. The radio quality is measured either using RSRP or RSRQ (see 3GPP TS 36.133 for further explanation).

The user equipment triggers the intra-frequency handover procedure by sending Event A3 report to the eNB. This event occurs when the user equipment measures that the target cell is better than the serving cell with a margin "HOM". The user equipment is configured over RRC when entering a cell and the HOM is calculated from the following configurable parameters:

$$HOM = Ofs + Ocs + Off - Ofn - Ocn + Hys \qquad (2)$$

where Ofs is the frequency specific offset of the serving cell, Ocs is the cell specific offset (CIO) of the serving cell, Off is the a3-Offset, Ofn is the frequency specific offset of the neighbor cell, Ocn is the CIO of the neighbor cell and Hys is the hysteresis.

If the condition in (1) is satisfied and it remains valid for a certain duration known as Time To Trigger (TTT), the user equipment sends a measurement report to the serving eNB (in FIG. 14, event A3 is satisfied at point A and measurement report is sent at point B in time). When the serving eNB gets the measurement report, it may initiate a handover towards the neighbor.

In addition to event-triggered reporting, the user equipment may be configured to perform periodic measurement reporting. In this case, the same parameters may be configured as for event-triggered reporting, except that the user equipment starts reporting immediately rather than only after the occurrence of an event.

Handover

Handover is one of the important aspects of any mobile communication system, where the system provides service continuity of the user equipment by transferring the connection from one cell to another depending on several factors such as signal strength, load conditions, service requirements, etc. The provision of efficient/effective handovers (minimum number of unnecessary handovers, minimum number of handover failures, minimum handover delay, etc.), would affect not only the Quality of Service (QoS) of the end user but also the overall mobile network capacity and performance.

In LTE, UE-assisted, network controlled handover is utilized (3GPP TS 36.300). The handover is based on user equipment reports, and the user equipment 101 is moved, if required and possible, to the most appropriate cell that will assure service continuity and quality.

Figure 15:
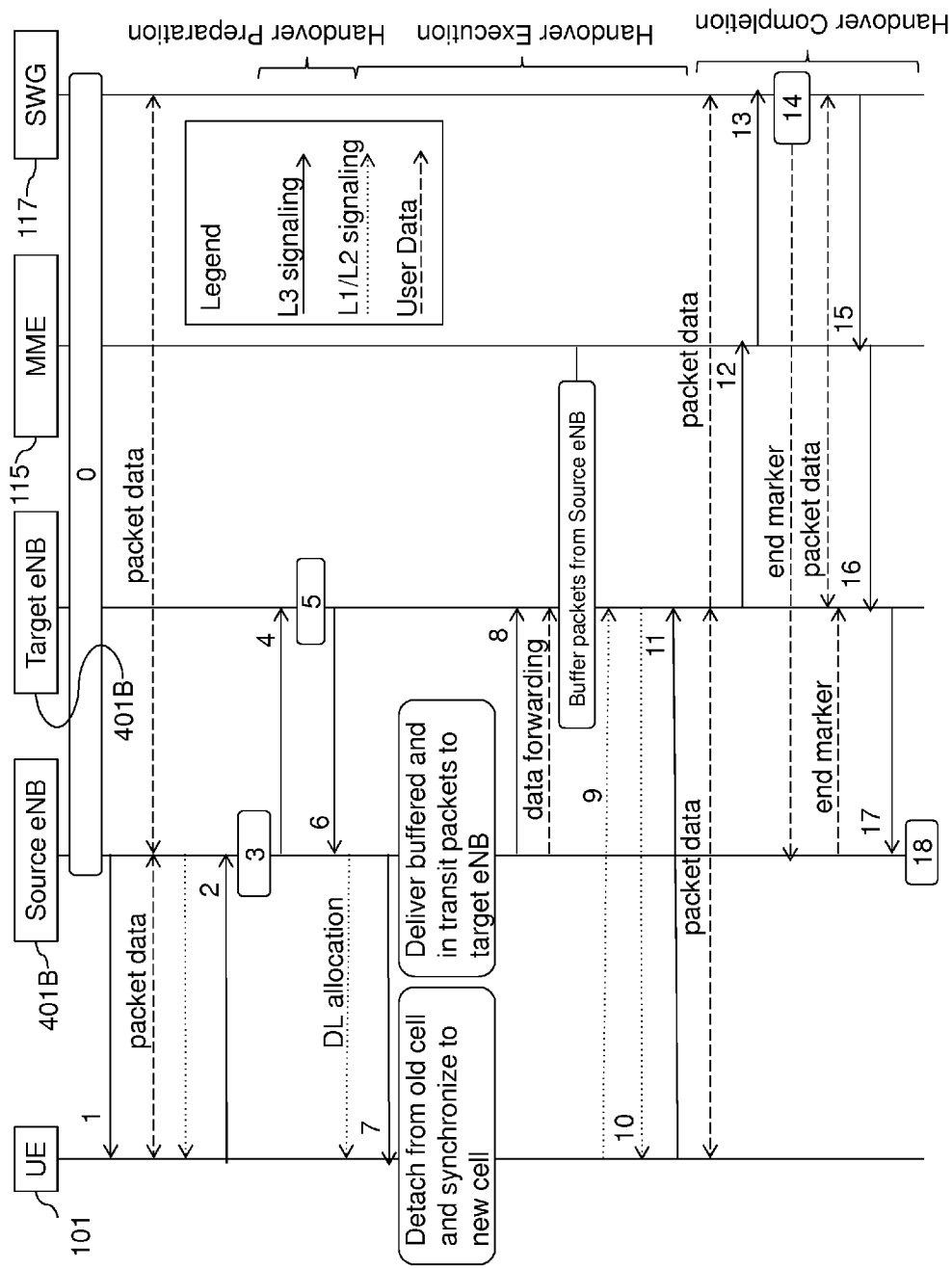
FIG. 15 is a messaging diagram illustrating an example of an X2 handover in LTE.

Handover is performed via the X2 connection, whenever available, and if not, using S1 (i.e., involving the Core Network (CN)). The X2 Handover process is shown in FIG. 15. The handover procedure can be sub-divided into three stages of preparation (initiation), execution and completion.

During the preparation stage, based on the measurement results the source eNB is getting from the user equipment, the source eNB decides whether to handover the connection to another eNB or not. If the decision is to handover, the source eNB sends a HANDOVER REQUEST message to the target eNB. The source eNB must indicate the cause of the HO in this message. Example causes for HO may be for radio reasons, resource optimisation, and/or to reduce the load in the serving cell.

Thus the target eNB knows that the HO is due to resource optimization or to reduce the load in the serving cell. If the target eNB is able to admit the user equipment, a message is sent to the user equipment to initiate the handover, and we enter the handover execution state. DL data arriving at the source eNB for the user equipment are then forwarded to the new target eNB.

The handover completion stage is entered once the target eNB and the user equipment are synchronized and a handover confirm message (step 11 of FIG. 15) is received by the target eNB. After a proper setup of the connection with the target eNB is performed (which comprises the switching of the DL path in the serving gateway), the old connection is released and any remaining data in the source eNB that is destined for the user equipment is forwarded to the target eNB. Then normal packet flow may ensue through the target eNB.

OVERVIEW OF THE EXAMPLE EMBODIMENTS

LTE currently supports only one to one connections between user equipments and eNBs. As such, when a handover is initiated, the target is asked to admit all the bearers of the user equipment. If for some reason, such as overload situation, that some of the bearers can't be admitted at the target, the source may either cancel the handover (and possibly try another candidate target) or accept it and handover the user equipment to the target, which will result in the dropping of the non-admitted bearers. This may have severe consequences on the overall experience of the user. Current specifications do not allow the setup of bearers in parallel and in multiple eNBs for the same user equipment, which is needed for enabling multiple connectivity. This would allow an optimal distribution of bearers depending on their QoS and UL/DL requirements.

Thus, some of the example embodiments presented herein addresses the problem of mobility procedures allowing for distribution of user equipment bearers across multiple eNBs with the possibility to connect a user equipment to multiple eNBs. According to some of the example embodiments, an optimized approach to handover that takes advantage of multiple connectivity of a user equipment to several eNBs, where the handover can be triggered and/or executed at a bearer level rather than the current user equipment level approach that is used in LTE. Different handover triggering conditions may be set, and based on these conditions as well as other factors such as load and user equipment/network buffer conditions, a selective handover of only a subset of the user equipment bearers is performed.

A selective handover may be a handover of a subset of bearers associated with a user equipment. It should be appreciated that the sub-set may be an empty subset (e.g., zero bearers), any number less than the full set of bearers, or the full set of bearers associated with the user equipment. It should be appreciated herein that a selective handover may comprise a variety of different subcases. Examples of such subcases are provided below.

1) As a first use case, an anchor may keep all bearers, both SRBs and DRBs. Thus, the selective handover may be an empty handover where target is just prepared, and the user equipment synchronizes with the target without handing over any radio bearers.

2) A second use case may be that the anchor keeps all SRBs and some DRBs, while the target receives some DRBs associated with the user equipment via the handover procedure.

3) A third use case may be that the anchor keeps all SRBs, while target is handed over all DRBs.

4) As a fourth use case, the role of the anchor node may be switched. As an example, three methods for the switching of anchors are provided below.

a. According to some of the example embodiments, the target becomes the anchor (i.e., all SRBs are handed over to the target), and all DRBs may remain in source (which is the new assisting node). It should be appreciated that this may be viewed as an opposite scenario of use case 3.

b. According to some of the example embodiments, the target may become the anchor (i.e., all of the SRBs are handed over to the target), and the target may also take some DRBs. Meanwhile, some of the DRBs may still remain at the source. It should be appreciated that this may be viewed as an opposite scenario of use case 2.

c. According to some of the example embodiments, the target becomes the anchor (i.e., all of the SRBs are handed over to the target), and the target also takes all of the DRBs. It should be appreciated, in contrast to a full handover, here a relationship with the source is maintained. It should be appreciated that this may be viewed an opposite scenario of use case 1.

5) As a fifth use case, a selective handover may be provided between to assisting nodes. In this example use case the anchor remains the same, and some DRBs are switched between two the two assisting nodes.

6) As a sixth use case, a split of the control plane in the anchor and assisting node may occur. As an example, three methods for the split are provided.

a. According to some of the example embodiments, the source keeps all DRBs and some SRBs. The target gets some SRBs as a result of the handover procedure.

b. According to some of the example embodiments, the source may keep some of the DRBs and some of the SRBs, while the target receives some of the SRBs and some of the DRBs associated with the user equipment as a result of the selective handover.

c. According to some of the example embodiments, the source may keep some of the SRBs, while the target gets all DRBs and some of the SRBs associated with the wireless terminal as a result of the selective handover.

Further details of the example embodiments are described below according to the corresponding sub-heading. It should be appreciated that the example embodiments are described with the use of an LTE based system as an example, however, the example embodiments may be applied to any communications system. It should also be appreciated that the term wireless terminal and user equipment may be used interchangeably. It should further be appreciated that the term assisting node and assisting base station may also be used interchangeably.

Selection of Bearers to be Handed Over

According to some of the example embodiments, a source eNB may decide to initiate a selective handover of a subset of the bearers of a user equipment towards a target eNB. Several mechanisms can be employed by the source eNB to decide which bearers to choose for the selective handover.

According to some of the example embodiments, the source eNB has a static mapping that specifies which type of bearers should be comprised in the selective handover. Several mapping rules could be used, such as only non-GBR bearers, only GBR bearers, only GBR bearers with MBR above or below a certain level, only GBR bearers with GBR above or below a certain level, or only bearers that belong to a certain (set) of QCI(s), etc.

For example, if the deployment scenario is that the macro has good coverage and a pico node is deployed in another carrier frequency for high data rate boosting, the static mapping rule may be to choose only the high data rate bearers for selective handover towards the pico node.

According to some of the example embodiments, the source eNB configures the user equipment with multiple measurement reporting configurations, and depending on which report gets triggered, decides the bearers to be comprised in the selective handover. As a simple example, the source eNB may configure two measurement configurations based on the A3 Event, and set different threshold values for each. If the first report gets triggered, the eNB may choose certain bearers (e.g. non GBR bearers) for the selective handover, and similarly, if the second report gets triggered, the eNB may choose other kind of bearers (e.g. GBR bearers) for the selective handover. Note that this is just an example, and other events can be used to select different bearers.

According to some of the example embodiments, the source eNB may decide which bearers to handover based on the buffer levels of the different bearers. For example, only bearers that have buffers filled above or below a certain level are chosen for selective handover.

According to some of the example embodiments, new triggering events, which are specifically suitable for selective handovers, are defined. For example, an A7 event may be defined that is triggered only when the user equipment buffer raises above a specified threshold level for certain kind of bearers and the radio conditions with the serving cell becomes worse than a specified threshold.

According to some of the example embodiments, the source eNB may decide which bearers are to be handover based on the load situation at the source and target eNBs. For example, more bearers could be comprised in the selective handover if the target eNB is unloaded. Legacy X2 RESOURCE STATUS UPDATE messages could be employed to exchange the load status information between the source and target eNBs.

According to some of the example embodiments, a source eNB may configure a lower threshold value to trigger early measurements and when these measurements are received, the serving eNB may decide to initiate selective handover to the target eNB but with an empty bearer list (i.e. not handing over anything). The purpose of this "empty handover" may be to allow synchronization of the user equipment to the target eNB cell. In case such "empty" selective handover is carried out and the user equipment is synchronized to the target eNB cell, it will be possible to transmit future mobility signalling from both serving and target cell. According to some of the embodiments, the sub-set of bearers may comprise all the bearers associated with the wireless terminal, or user equipment.

According to some of the example embodiments, a source eNB may configure a higher threshold value in a measurement configuration, and when such measurement is triggered, the serving eNB initiates a full (legacy) handover towards the target eNB. It should be appreciated that the selection mechanisms described above may be used in any combination.

Initiation of the Handover

According to some of the example embodiments, a source eNB may decide to initiate the handover of the signalling radio bearers towards the target eNB. After the handover the target becomes the anchor node (the termination point for the control plane) and the source becomes the assisting node. The source eNB may also choose to comprise some data radio bearers in this handover request. That is, after the handover, the source might handle some data radio bearers of the user equipment, while the target will handle all the signalling radio bearers and the other data radio bearers.

During such handover procedure and in case the user plane, for example, PDCP or PDCP and RLC, is terminated in the anchor node, the mechanism comprises switching all user plane bearers traffic from the core network to the new anchor node. Namely, in an anchor node terminated the user plane scenario, a handover that implies a change in the anchor node also implies switching user plane bearers' traffic termination from an old anchor node to a new anchor node. In this procedure, the PATH SWITCH REQUEST message towards the core network will indicate switching of all bearers towards the new anchor node, while (in case source and target cell do not reside in the same node) the X2: HANDOVER REQUEST message will indicate to the new anchor node (target node) which bearer traffic shall be transmitted over the air at the new anchor node cell and which shall be transmitted at the new assisting node cell.

According to some of the example embodiments, the target eNB does not belong to the same soft cell as the source eNB, for example, the target eNB an independent eNB such as a neighbour macro eNB or a pico eNB operating as a standalone cell. That is, for the concerned user equipment, the target eNB will play the role of the assisting eNB.

In legacy handover, the source eNB prepares the target eNB using the HANDOVER REQUEST message over X2, as shown in FIG. 15. The contents of this message are shown in Table 1. This X2AP message comprises a transparent container comprising the RRC context from the source. For selective handover, the same principles may be reused, but the message content has to be modified, since the RRC control context remains in the source eNB, and only a set of E-RABs are requested to be handed over.

TABLE 1

X2 HANDOVER REQUEST message

| IE/Group Name | Presence |
|---|---|
| Message Type | M |
| Old eNB UE X2AP ID | M |
| Cause | M |
| Target Cell ID | M |
| GUMMEI | M |
| UE Context Information | |
| >MME UE S1AP ID | M |
| >UE Security Capabilities | M |
| >AS Security Information | M |
| >UE Aggregate Maximum Bit Rate | M |
| >Subscriber Profile ID for RAT/Frequency priority | O |
| >E-RABs To Be Setup List | |
| >>E-RABs To Be Setup Item | |
| >>>E-RAB ID | M |
| >>>E-RAB Level QoS Parameters | M |
| >>>DL Forwarding | O |
| >>>UL GTP Tunnel Endpoint | M |
| >RRC Context | M |
| >Handover Restriction List | O |
| >Location Reporting Information | O |
| >Management Based MDT Allowed | O |
| UE History Information | M |
| Trace Activation | O |
| SRVCC Operation Possible | O |
| CSG Membership Status | O |

According to some of the example embodiments, the target eNB is informed that a given handover is a selective handover rather than a legacy handover, for example, a full handover where all the bearers of the user equipment have to be handed over, during handover preparation signaling. In case the target eNB receives multiple selective handover requests concerning the same user equipment from the same source eNB, it shouldn't be interpreted as an error, but rather as a request to selectively hand over even more bearers of the user equipment towards the target.

According to some of the example embodiments, if the anchor connection is lost while the user equipment has an assisting link active, the assisting eNB may assume the role of the anchor, for example, terminate the control plane and SRBs. The new anchor (the old assisting eNB) may use the MME UE S1AP ID that was received during the handover request to recover the context of the user equipment from the MME (or any other mobility management node) and hence be able to re-establish any radio bearers that were being served via the previous anchor.

The legacy X2 HANDOVER REQUEST message already comprises a list of E-RABs to be setup. For the case of selective handover, this list may also be used to cover the data radio bearers that the anchor wants to handover to the assisting cell. The rest of the E-RABs will remain at the source eNB. So, this list may be used as is. However, if a partial list of E-RABs is comprised in the X2: HANDOVER REQUEST message the target is assumed to send a PATH SWITCH REQUEST message to the MME indicating switching of bearers listed in X2: HANDOVER REQUEST message. Current specifications in TS 36.413 specify that "[i]f the E-RAB To Be Switched in Downlink List IE in the PATH SWITCH REQUEST message does not comprise all E-RABs previously comprised in the UE Context, the MME shall consider the non-included E-RABs as implicitly released by the eNB."

The above means that according to current specifications the bearers not listed in the PATH SWITCH REQUEST and assigned to the user equipment will be automatically dropped by the MME (or any other mobility management node). Therefore, according to some of the example embodiments, two alternatives may be envisioned to prevent such E-RAB termination.

First, the PATH SWITCH REQUEST message shall be enhanced with a new IE indicating that a selective handover is ongoing and the non-listed E-RABs shall not be dropped. Second, the MME shall be configured, for example, via the OAM system, so to avoid E-RAB terminations for the E-RABs not listed in the PATH SWITCH REQUEST message. The latter decision may be taken either unconditionally or depending on a source node identity, which may be derived by the Source MME UE S1AP ID IE and Source MME GUMMEI IE in PATH SWITCH REQUEST message.

An example of how the PATH SWITCH REQUEST message IEs may be enhanced is shown in Table 1a, where a new IE named Selective Handover Indicator IE has been added as an example of how selective handovers could be flagged to the MME.

TABLE 1a

PATH SWITCH REQUEST message

| IE/Group Name | Presence | Range | Semantics description | Criticality | Assigned Criticality |
|---|---|---|---|---|---|
| Message Type | M | | | YES | reject |
| eNB UE S1AP ID | M | | | YES | reject |
| E-RAB To Be Switched in Downlink List | | 1 | | YES | reject |
| >E-RABs Switched in Downlink Item IEs | | 1 to <maxnoof E-RABs> | | EACH | reject |
| >>E-RAB ID | M | | | — | |
| >>Transport layer address | M | | | — | |
| >>GTP-TEID | M | | To deliver DL PDUs | — | |

TABLE 1a-continued

PATH SWITCH REQUEST message

| IE/Group Name | Presence | Range | Semantics description | Criticality | Assigned Criticality |
|---|---|---|---|---|---|
| Source MME UE S1AP ID | M | | | YES | reject |
| E-UTRAN CGI | M | | | YES | ignore |
| TAI | M | | | YES | ignore |
| UE Security Capabilities | M | | | YES | ignore |
| CSG Id | O | | | YES | ignore |
| Cell Access Mode | O | | | YES | ignore |
| Source MME GUMMEI | O | | | YES | ignore |
| Selective Handover Indicator | O | ENUMER- ATED (true, . . .) | This IE indicates to MME that the handover is selective. IT helps MME to decide whether to maintain bearers not listed in the E-RABs To Be Switched In Downlink List | YES | ignore |

User Equipment Mobility/History Information

In legacy LTE, historical information of the user equipment's mobility is maintained at the eNB and propagated to a target eNB when handover is performed via the X2 HANDOVER REQUEST message in an IE called UE History Information. This IE comprises a list of up to the last 16 cells the user equipment has visited, along with the cell type and the time the user equipment stayed in the corresponding cell. The user equipment history information is useful for optimizations such as ping pong handover detection, and estimation of user equipment mobility state which may be further used to scale speed dependent handover triggering parameters such as TTT. With the use of multiple connectivity, which allows the user equipment to be connected to multiple cells at the same time, the use of user equipment history has to be adapted accordingly.

According to some of the example embodiments, selective handovers are treated the same way as in legacy LTE full handovers, and the user equipment history information is updated accordingly. For example, if a user equipment goes from IDLE to CONNECTED mode in cell A at time t1, selectively handed over to cell B at time t2, removed from cell B back to cell A at time t3, for example, all the bearers that were connected to B now associated with A again, and fully handed over to cell C at time t4, the user equipment history information received by the node supporting Cell C during handover preparation towards Cell C will comprise the entries shown in Table 2.

TABLE 2

User equipment history, selective handovers treated as full handovers

| Cell ID | Cell Type | Time UE stayed in a cell |
|---|---|---|
| A | Type 1 | t2-t1 |
| B | Type 2 | t3-t2 |
| A | Type 1 | t4-t3 |

According to some of the example embodiments, the selective handovers are also treated the same way, but the time the user equipment stayed in a cell will be measured as the duration between the first time the user equipment is handed over to the cell (either fully or selectively) and the time it completely leaves that cell (i.e. no bearers with the concerned cell and also UE context released) between full handovers. For the same example as above, the user equipment history information in this case will be like the entries shown in Table 3.

TABLE 3

User equipment history, selective handovers treated as full handovers, but source eNB time kept active.

| Cell ID | Cell Type | Time UE stayed in a cell |
|---|---|---|
| A | Type 1 | t4-t1 |
| B | Type 2 | t3-t2 |

According to some of the example embodiments, selective handovers are not registered in the user equipment history information. For the same example as above, the user equipment history information in this case will be like the entries shown in Table 4.

TABLE 4

User equipment history, selective handovers ignored in the user equipment history.

| Cell ID | Cell Type | Time UE stayed in a cell |
|---|---|---|
| A | Type 1 | t4-t1 |

The advantage of these three ways of updating the user equipment history information is that they are backward compatible. However, the information regarding multiple connectivity is lost. In order to capture this, the user equipment history information IE has to be modified.

According to some of the example embodiments, a timestamp field is added in the user equipment history information IE that tells exactly when the user equipment was handed over to a cell. So for the same example as above, the user equipment history information will be like the entries shown in Table 5. Thus by looking at the timestamp and the duration, cell C can find out that the user equipment was connected to both cells during the time duration t3-t2.

TABLE 5

User equipment history, selective handovers implicitly indicated via time-stamping.

| Cell ID | Cell Type | Time UE started connection in a cell | Time UE stayed in a cell |
| --- | --- | --- | --- |
| A | Type 1 | t1 | t4-t1 |
| B | Type 2 | t2 | t3-t2 |

According to some of the example embodiments, a handover type field is added to the user equipment history to indicate selective handovers. For the same example as above, the user equipment history information will look like Table 6.

TABLE 6

User equipment history, selective handovers indicated explicitly.

| Cell ID | Cell Type | Handover type | Time UE stayed in a cell |
| --- | --- | --- | --- |
| A | Type 1 | Selective | t2-t1 |
| B | Type 2 | Selective | t3-t2 |
| A | Type 1 | Selective | t4-t3 |

According to some of the example embodiments, an additional IE is comprised in the user equipment history information which indicates the anchor/assisting roles played by the eNBs for that particular user equipment. This additional information may be useful during recovery from failures. For the same example as above, the user equipment history information will look like Table 7.

TABLE 7

User equipment history, selective handovers and eNB roles indicated explicitly.

| Cell ID | Cell Type | Handover type | Cell Role | Time UE stayed in a cell |
| --- | --- | --- | --- | --- |
| A | Type 1 | Selective | Anchor | t2-t1 |
| B | Type 2 | Selective | Assisting | t3-t2 |
| A | Type 1 | Selective | Anchor | t4-t3 |

The other IEs in the legacy X2 HANDOVER REQUEST message (i.e. Message Type, Old eNB UE X2AP ID, Cause, Target Cell ID, GUMMEI, Trace Activation, SRVCC Operation Possible and CSG Membership Status) may be used as is for selective handovers.

Handover Acknowledgement

In legacy handover, as shown in when the target eNB receives a HANDOVER REQUEST message, it performs admission control and if it may admit one or more of the data radio bearers comprised in the request, it sends a HANDOVER REQUEST ACKNOWLEDGE message over X2 towards the source eNB, as shown in FIG. 15. The contents of this message are shown in Table 8. The bearers that are not admitted are comprised in the E-RABs Not Admitted List IE. As can be seen from the table, all the IEs in this message can be used as is for supporting selective handovers.

TABLE 8

X2 HANDOVER REQUEST ACKNOWLEDGE message

| IE/Group Name | Presence |
| --- | --- |
| Message Type | M |
| Old eNB UE X2AP ID | M |
| New eNB UE X2AP ID | M |
| E-RABs Admitted List | |
| > E-RABs Admitted Item | |
| >> E-RAB ID | M |
| >> UL GTP Tunnel Endpoint | O |
| >> DL GTP Tunnel Endpoint | O |
| E-RABs Not Admitted List | O |
| Target eNB To Source | M |
| eNB Transparent Container | |
| Criticality Diagnostics | O |

According to some of the example embodiments, when a HANDOVER REQUEST ACKNOWLEDGE message that comprises some entries in the E-RABs Not Admitted List is received, the source eNB decides to keep those bearers with itself and hand over only the ones listed in the E-RABs Admitted List.

According to some of the example embodiments, when a HANDOVER REQUEST ACKNOWLEDGE message that comprises some entries in the E-RABs Not Admitted List is received, the source eNB decides to cancel the handover. The source can communicate this to the target using the X2 HANDOVER CANCEL message, with a cause value of "partial handover".

According to some of the example embodiments, when a HANDOVER REQUEST ACKNOWLEDGE message that comprises some entries in the E-RABs Not Admitted List is received, the source eNB decides to drop those bearers and hand over only the ones listed in the E-RABs Admitted List.

According to some of the example embodiments, the source eNB sends out a full handover request (legacy HO) and when it gets a HANDOVER REQUEST ACKNOWLEDGE where there are some entries in the E-RABs Not Admitted List, will change the full handover request to selective handover (if it knows that the target accepts selective handovers). This may be done in several ways. For example, the source eNB explicitly cancels the handover request by sending an X2 HANDOVER CANCEL command with a cause value of "partial Handover" towards the target followed by a selective HANDOVER REQUEST that comprises only the bearers that the target was able to admit in the handover that was just cancelled. As another example, the source may implicitly notify the change of the handover from full to selective by sending an X2 HANDOVER REQUEST message. As a further example, the source eNB may send a new X2 message, for example, HANDOVER REQUEST UPDATE, towards the target that tells it to change the previous handover request from full to selective. Any messages sent by the source eNB may be sent with a selective handover IE set and with the list of the bearers that the target was able to admit.

According to some of the example embodiments, the target eNB, when it gets an X2 HANDOVER REQUEST for a user equipment that it has already received and prepared for a handover request, and that the new request is a selective handover request, or when it gets a HANDOVER REQUEST UPDATE message, will update the handover as selective (i.e. it will not try to setup the SRBs when the user equipment connects to it later on) and resends an X2

HANDOVER REQUEST ACKNOWLEDGE message. For the sake of consistency, the sender may provide the list of bearers to be admitted in the X2 HANDOVER REQUEST and HANDOVER REQUEST UPDATE messages, but this is not required, as the target already has this information from the previous request.

According to some of the example embodiments, when an X2 HANDOVER REQUEST ACKNOWLEDGE message is received, the source eNB decides to handover only a sub set of the admitted bearers and keep the rest with itself. This may be communicated in several ways as above, for example, by explicitly canceling the handover followed by a new request, sending a request that will invalidate the previous one, or sending a new X2 message (e.g. HANDOVER REQUEST UPDATE).

According to some of the example embodiments, the target eNB, when it gets an X2 HANDOVER REQUEST for a UE that has already received and prepared for a handover request (either full or selective handover), and that the new request is a selective handover request, or when it gets a HANDOVER REQUEST UPDATE message, will update the handover as selective (if the previous one was not selective and in that case it will not try to setup the SRBs when the UE connects to it later on) and resend an X2 HANDOVER REQUEST ACKNOWLEDGE message. In this case, the X2 HANDOVER REQUEST and HANDOVER REQUEST UPDATE messages comprise the bearers to be admitted (as they are different from the ones that were listed in the original admitted list). The target also releases any resources that it might have reserved for the bearers not comprised in this updated list.

Subsequent Selective Handovers

According to some of the example embodiments, upon performing a first selective handover, any number of subsequent handovers may be performed. Therefore, according to some of the example embodiments, the target eNB keeps, after accepting a selective handover, the mapping of the New eNB UE X2AP ID and Old eNB UE X2AP ID.

According to some of the example embodiments, when the source eNB selectively hands over the HANDOVER REQUEST ACKNOWLEDGE message, it keeps the mapping of the New eNB UE X2AP ID and Old eNB UE X2AP ID, so that if a HANDOVER REQUEST is received later on from the target eNB that has the same Old eNB UE X2AP ID as the New eNB UE X2AP ID saved in this mapping, it knows that it is a user equipment that is returning towards the anchor after being selectively handed over for some time.

According to some of the example embodiments, an eNB acting like an assisting node, to which some of the user equipment bearers have been selectively handed over to from the anchor eNB, may later on perform a selective handover of the user equipment to another assisting eNB. This may be performed in several ways. As an example, the old assisting node may hand over the bearers back to the anchor, with an indication (e.g., via a new IE in the X2 HANDOVER REQUEST message) that recommends the selective handover of these bearers to the new assisting node. The anchor may use the recommendation and may handover the bearers to the new assisting node or decide to keep it with itself or drop them.

Another example of a selective handover may be when the old assisting node sends an X2 HANDOVER REQUEST message towards the new assisting node, but with an additional indication about the anchor node responsible for the user equipment (e.g., via a new IE). The new assisting node then sends the HANDOVER REQUEST ACKNOWLEDGE message towards the anchor node. The anchor may implicitly assume the assisting node has been changed when it receives this. For example, the old assisting node may use the Old eNB X2 AP ID that it has originally received from the anchor as the Old eNB X2 AP ID in the HANDOVER REQUEST message it is sending instead of the eNB X2 AP ID that it is using, i.e., the one that was indicated in New eNB X2 AP ID during the handover between the anchor and the old assisting node.

Another example, similar to the above case, may be that the assisting node also sends a new X2 message to the anchor indicating that it has initiated selective handover towards the new assisting node immediately after sending the request to the new assisting node. As such the assisting node relocation is explicitly known at the anchor, and the anchor knows the success of it with the reception of HANDOVER REQUEST ACKNOWLEDGE from the new assisting node.

According to some of the example embodiments, the old assisting node sends an X2 HANDOVER REQUEST message towards the new assisting node, waits to get the X2 HANDOVER REQUEST ACKNOWLEDGE message, and forwards this towards the anchor in a transparent container comprised in a new X2 message (e.g., X2 ASSISTING RELOCATION). According to some of the example embodiments, when the anchor eNB finds out that an assisting relocation has been performed, it updates the mapping of the Old eNB UE X2 AP ID to the New eNB UE X" AP ID, based on the New eNB UE that is being used in the new assisting node.

Example Node Configuration

Figure 16:
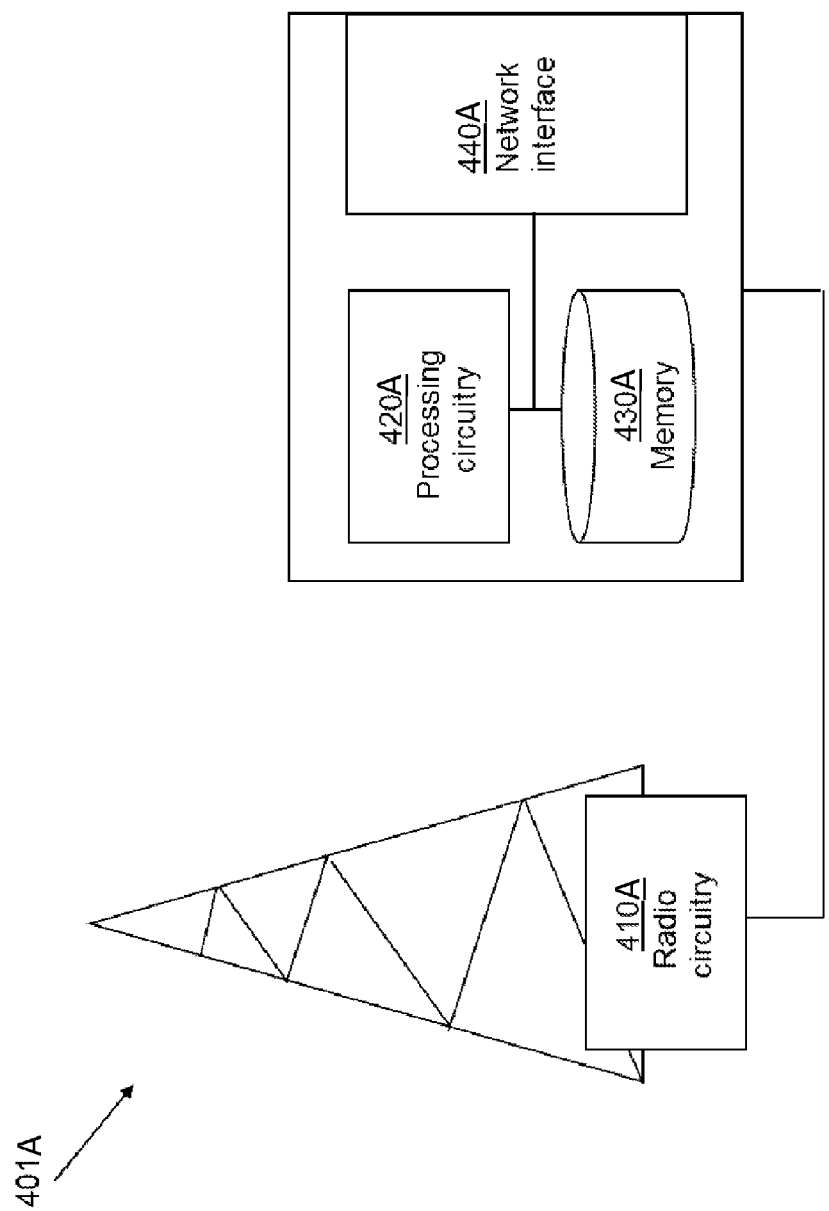
FIG. 16 is an example node configuration of a source base station, according to some of the example embodiments presented herein.

FIG. 16 illustrates an example node configuration of a source base station or eNB 401A which may perform some of the example embodiments described herein. It should be appreciated that the base station illustrated in FIG. 16 may be an anchor or assisting eNB. The base station 401A may comprise radio circuitry or a communication port 410A that may be configured to receive and/or transmit communication data, instructions, and/or messages. It should be appreciated that the radio circuitry or communication port 410A may be comprised as any number of transceiving, receiving, and/or transmitting units or circuitry. It should further be appreciated that the radio circuitry or communication 410A may be in the form of any input or output communications port known in the art. The radio circuitry or communication 410A may comprise RF circuitry and baseband processing circuitry (not shown).

The base station 401A may also comprise a processing unit or circuitry 420A which may be configured to provide a selective handover, or a handover of a sub-set of bearers associated with a user equipment. The processing circuitry 420A may be any suitable type of computation unit, for example, a microprocessor, digital signal processor (DSP), field programmable gate array (FPGA), or application specific integrated circuit (ASIC), or any other form of circuitry. The base station 401A may further comprise a memory unit or circuitry 430A which may be any suitable type of computer readable memory and may be of volatile and/or non-volatile type. The memory 430A may be configured to store received, transmitted, and/or measured data, device parameters, communication priorities, and/or executable program instructions.

Figure 17:
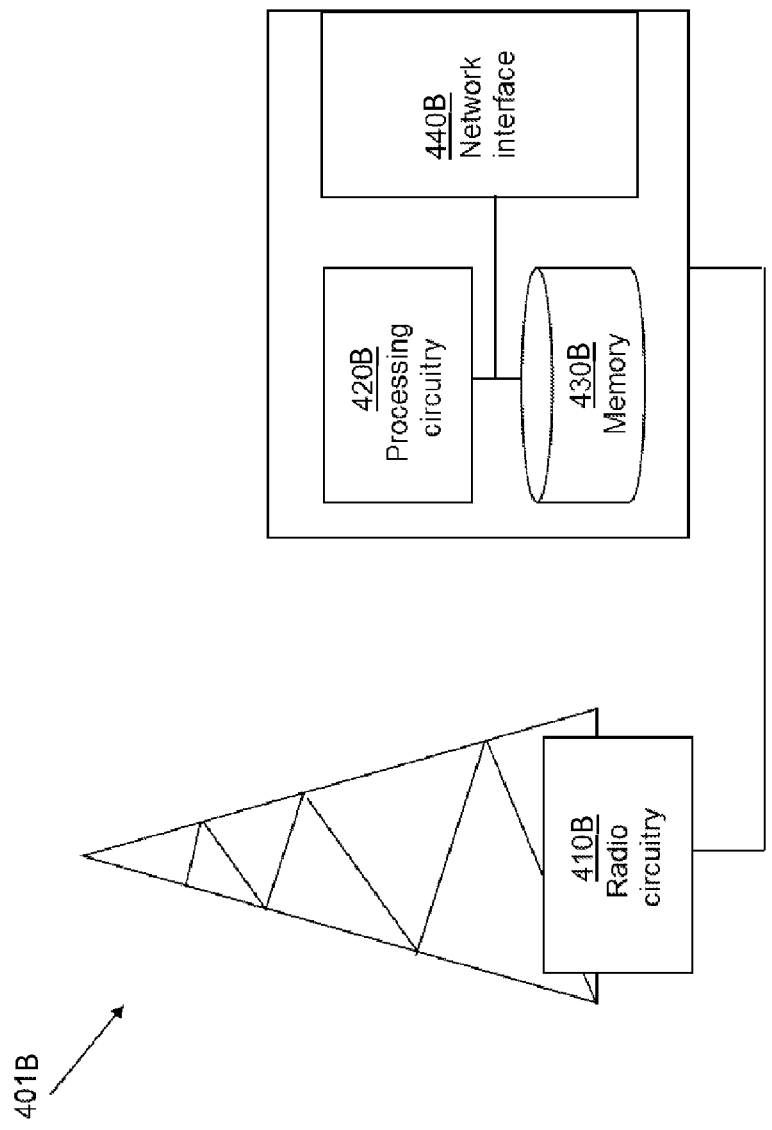
FIG. 17 is an example node configuration of a target base station, according to some of the example embodiments presented herein.

FIG. 17 illustrates an example node configuration of a target base station or eNB 401B which may perform some of the example embodiments described herein. It should be appreciated that the base station illustrated in FIG. 17 may be an anchor or assisting eNB. The base station 401B may comprise radio circuitry or a communication port 410B that may be configured to receive and/or transmit communication data, instructions, and/or messages. It should be appreciated that the radio circuitry or communication port 410B may be comprised as any number of transceiving, receiving, and/or transmitting units or circuitry. It should further be appreciated that the radio circuitry or communication 410B may be in the form of any input or output communications port known in the art. The radio circuitry or communication 410B may comprise RF circuitry and baseband processing circuitry (not shown).

The base station 401B may also comprise a processing unit or circuitry 420B which may be configured to provide a selective handover, or a handover of a sub-set of bearers associated with a user equipment. The processing circuitry 420B may be any suitable type of computation unit, for example, a microprocessor, digital signal processor (DSP), field programmable gate array (FPGA), or application specific integrated circuit (ASIC), or any other form of circuitry. The base station 401B may further comprise a memory unit or circuitry 430B which may be any suitable type of computer readable memory and may be of volatile and/or non-volatile type. The memory 430B may be configured to store received, transmitted, and/or measured data, device parameters, communication priorities, and/or executable program instructions.

Example Node Operations

Figure 18:
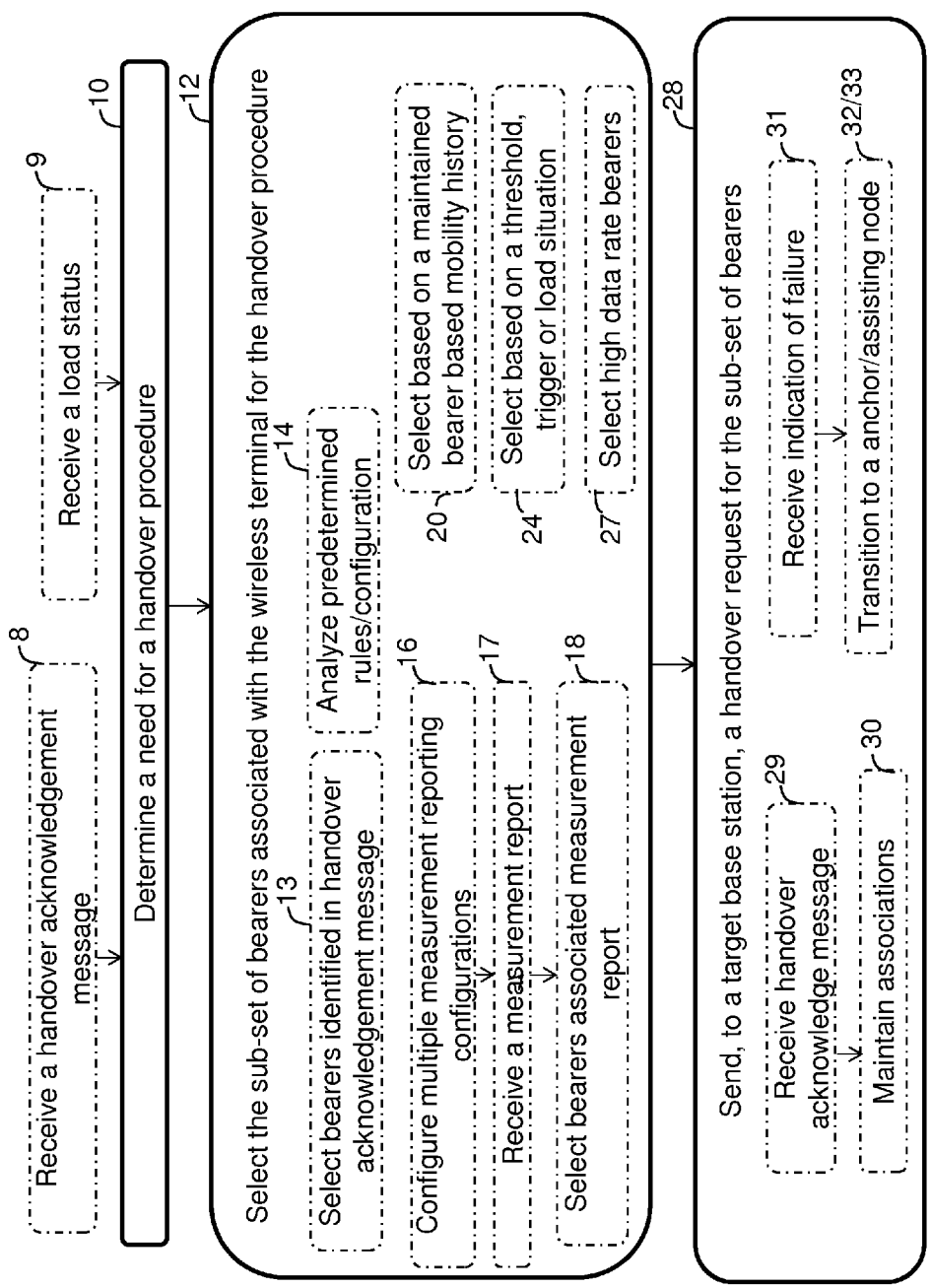
FIG. 18 is a flow diagram depicting example operations of the source base station of FIG. 16, according to some of the example embodiments presented herein.

FIG. 18 is a flow diagram depicting example operations which may be taken by the source base station 401A as described herein to provide a selective handover, or a handover of a sub-set of bearers associated with a user equipment. It should be appreciated that FIG. 18 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order.

Furthermore, it should be appreciated that not all of the operations need to be performed. The example operations may be performed in any order and in any combination. It should also be appreciated that the actions may be performed by an anchor or assisting base station.

It should be appreciated in some of the example embodiments presented in FIG. 18, the source and target base stations may comprise an assisting-assisting pairing or an anchor-assisting pairing. According to some of the example embodiments presented in FIG. 18, the source and target base stations may use different bidirectional modes or communication. Examples of such bidirectional modes of communication are TDD or FDD.

Example Operation 8

According to some of the example embodiments, the source base station 401A may be configured to receive 8, from the target base station 401B, a handover acknowledgement message. The handover acknowledgement message may provide an indication of a failed full handover (e.g., a legacy handover) involving all bearers associated with the wireless terminal (e.g., a user equipment). The handover acknowledgement message may further comprise an identification of bearers which are able to be handed over. The radio circuitry 410A may be configured to receive, from the target base station 401B, the handover acknowledgement message.

Thus, upon learning that a full handover is not possible, the source base station 401A may initiate a selective handover for a sub-set of bearers, for example, the bearers which have been indicated in the acknowledgement message as being capable of being handed over.

Example Operation 9

According to some of the example embodiments, the source base station 401A may be configured to receive 9, from the target base station 401B, a target base station load status. A need for a selective handover procedure may be determined based on the target base station load status. The radio circuitry 410A may be configured to receive, from the target base station 410B, the target base station load status.

Operation 10

The source base station 401A is configured to determine 10 a need for a handover procedure, for example a selective handover procedure. The processing circuitry 420A is configured to determine the need for the handover procedure. It should be appreciated that example operations 8 and 9 are merely examples of how such a determination may be made. The determination of a need for a handover procedure may be made via any means described herein or known in the art.

Operation 12

The source base station 401A is further configured to select 12 a sub-set of bearers associated with the wireless terminal. The processing circuitry 420A is configured to select the sub-set of bearers associated with the wireless terminal. It should be appreciated that the sub-set of bearers are a number of bearers which is less than or equal to a total number of bearers that is associated with the wireless terminal.

Example Operation 13

According to some of the example embodiments, the selecting 12 may further comprise selecting 13 the sub-set of bearers identified in the handover acknowledgement message, for example as described in example operation 8. The processing circuitry 420A may be configured to select the sub-set of bearers identified in the handover acknowledgement message.

Example Operation 14

According to some of the example embodiments, the selecting 12 may comprise analyzing 14 predetermined rules for selecting the sub-set of bearers and selecting the sub-set of bearers based on the analysis of the predetermined rules. The processing circuitry 420A may be configured to analyze the predetermined rules for selecting the sub-set of bearers.

According to some of the example embodiments, the predetermined rules may comprise the selection of non-guaranteed bit rate bearers, the selection of guaranteed bit rate bearers, the selection guaranteed bit rate bearers with a maximum bit rate above or below a threshold level, the selection of guaranteed bit rate bearers with a guaranteed rate above or below a threshold value, and/or the selection of bearers with respect to a QCI. It should be appreciated that these are merely examples and the predetermined rules may comprise any means of selection described herein.

Example Operation 16

According to some of the example embodiments, the selecting 12 may comprise configuring 16 the wireless terminal with different measurement reporting configurations with respect to different sub-sets of bearers associated with the wireless terminal. The processing circuitry 420A may configure the wireless terminal with different measurement reporting configurations with respect to different subsets of bearers associated with the wireless terminal.

Example Operation 17

According to some of the example embodiments, the configuring 16 may further comprise receiving 17, from the wireless terminal, a measurement report provided as a result of at least one measurement reporting configuration. The radio circuitry 410A is configured to receive, from the wireless terminal, the measurement report provided as a result of the at least one measurement reporting configuration.

Example Operation 18

According to some of the example embodiments, the configuring 16 and receiving 17 may further comprise selecting 18 the sub-set of bearers based on a result of the received measurement report. The processing circuitry 420A may be configured to select the sub-set of bearers based on the result of the received measurement report.

Example Operation 20

According to some of the example embodiments, the selecting 12 further comprises selecting 20 the sub-set of bearers based on a maintained bearer based mobility history of the wireless terminal. The processing circuitry 420A may be configured to select the sub-set of bearers based on the maintained bearer based mobility history of the wireless terminal.

Example Operation 24

According to some of the example embodiments, the selecting 12 further comprises selecting 24 the sub-set of bearers based on any one or more of a threshold, triggering event, a radio signal level, a buffer level of a bearer, and/or a load situation at the source and/or target base station. The processing circuitry 420A may be configured to select the sub-set of bearers based on any one or more of a threshold, triggering event, a radio signal level, a buffer level of a bearer, and/or a load situation at the source and/or target base station.

Example Operation 27

According to some of the example embodiments, the wireless network may comprise at least one macro and at least one pico, or another macro, node or cell in another carrier or same carrier, frequency for high data rate boosting. In such example embodiments, the selecting 12 may further comprise selecting 27 high data rate bearers for a handover procedure towards the at least one pico, or the another macro, node or cell. The processing circuitry 420A may be configured to select high data rate bearers for a handover procedure towards the at least one pico, or the another macro, node or cell.

Operation 28

The source base station is configured to send 28, to the target base station, a handover request for the sub-set of bearers, wherein at least one bearer of the wireless terminal remains connected to the source base station. The radio circuitry 410A is configured to send, to the target base station, the handover request for the sub-set of bearers. It should be appreciated that the at least one bearer may be a SRB and/or a DRB. It should be appreciated that the selective handover and the at least one bearer which remains connected to the source base station may further be described by any of the example use cases provided under the heading 'Overview of the example embodiments'.

Example Operation 29

According to some of the example embodiments, the source base station 401A may be configured to receive 29, from the target base station 401B, an acknowledgement message with respect to the handover procedure for the sub-set of bearers. The acknowledgement message may comprise a result of the handover procedure for each bearer of the sub-set of bearers. The radio circuitry 410A may receive, from the target base station 401B, the acknowledgement message with respect to the handover procedure for the sub-set of bearers.

Example Operation 30

According to some of the example embodiments, the receiving 28 may further comprise maintaining 30 an association with a bearer of the sub-set of bearers if the result of the handover procedure is not successful for the bearer. The processing circuitry 420A may be configured to maintain the association with the bearer of the sub-set of bearers if the result of the handover procedure is not successful for the bearer. Thus, by maintaining the association with a bearer which was not successfully handed over, a dropping of the bearer may be prevented.

Example Operation 31

According to some of the example embodiments, the source base station 401A may be configured to transition to an anchor or assisting base station upon completion of the handover procedure. The processing circuitry 420A may be configured to transition the source base station 401A to an anchor or assisting base station upon the completion of the handover procedure.

Example Operation 32

According to some of the example embodiments, the transitioning 31 may comprise receiving 32, from the wireless terminal, an indication of a radio link failure over an anchor link. The radio circuitry 410A is configured to receive, from the wireless terminal, the indication of the radio link failure over the anchor link.

Example Operation 33

According to some of the example embodiments, the transitioning 31 and receiving 32 may further comprise transitioning the source base station to an anchor base station. The processing circuitry 420A may be configured to transition the source base station to an anchor base station.

Figure 19:
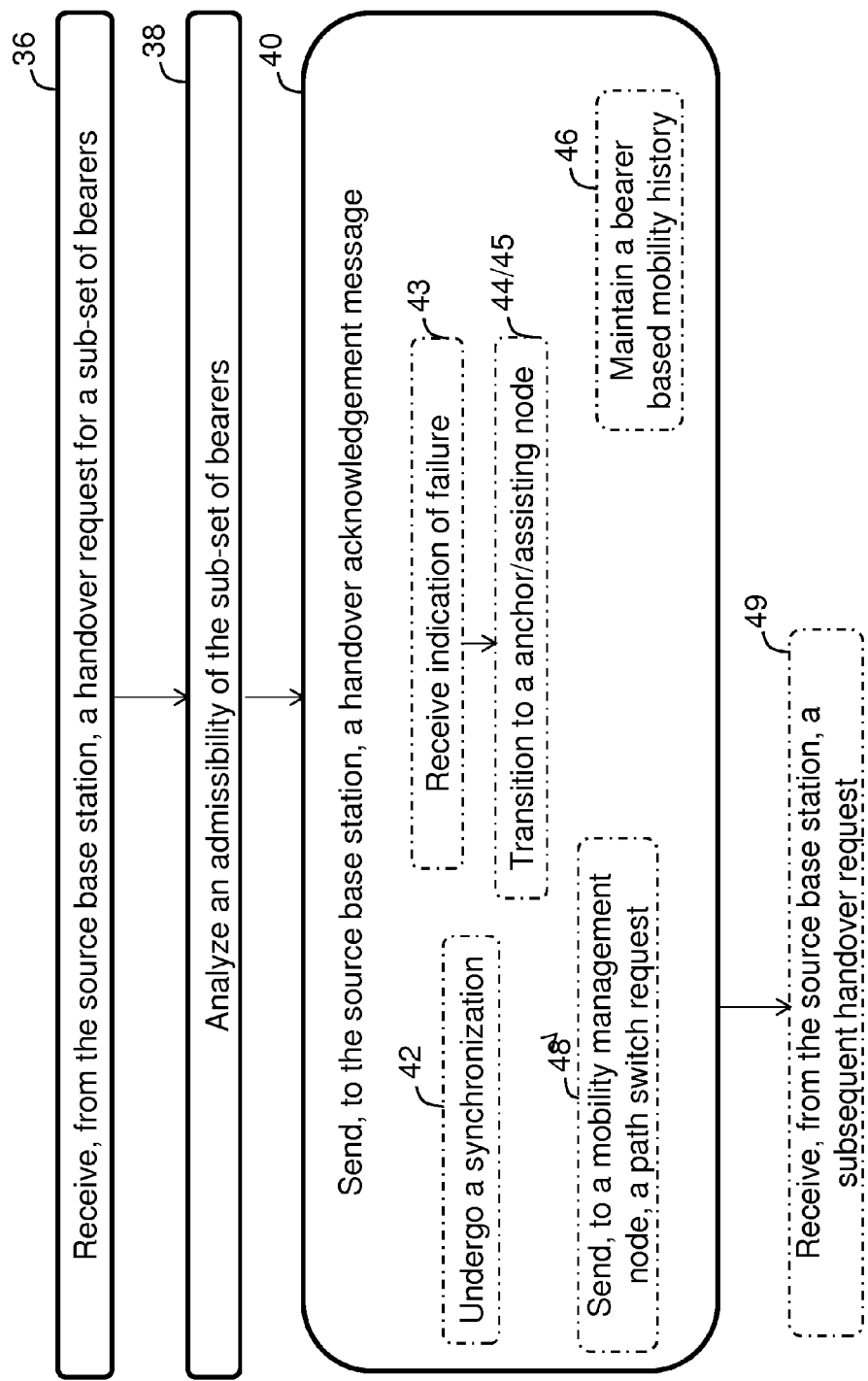
FIG. 19 is a flow diagram depicting example operations of the target base station of FIG. 17, according to some of the example embodiments presented herein.

FIG. 19 is a flow diagram depicting example operations which may be taken by the target base station 401B as described herein to provide a selective handover, or a handover of a sub-set of bearers associated with a user equipment. It should be appreciated that FIG. 19 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order.

Furthermore, it should be appreciated that not all of the operations need to be performed. The example operations may be performed in any order and in any combination. It should also be appreciated that the actions may be performed by an anchor or assisting base station.

It should be appreciated in some of the example embodiments presented in FIG. 19, the source and target base stations may comprise an assisting-assisting pairing or an anchor-assisting pairing. According to some of the example embodiments presented in FIG. 19, the source and target base stations may use different bidirectional modes or communication. Examples of such bidirectional modes of communication are TDD or FDD.

Operation 36

The target base station 401B is configured to receive 36, from the source base station 401A, a handover request for a sub-set of bearers, wherein at least one bearer of the wireless terminal is to remain connected to the source base station. The receiving circuitry 410B is configured to receive the handover request for the sub-set of bearers. It should be appreciated that the sub-set of bearers comprise a number of bearers which are less than or equal to a total number of bearers associated with the wireless terminal. It should be appreciated that the at least one bearer may be a SRB and/or a DRB. It should be appreciated that the selective handover and the at least one bearer which remains connected to the source base station may further be described by any of the example use cases provided under the heading 'Overview of the example embodiments'.

Operation 38

The target base station 401B is also configured to analyze 38 an admissibility of the sub-set of bearers with respect to the handover procedure. The processing circuitry 420B is configured to analyze the admissibility of the sub-set of bearers with respect to the handover procedure.

Operation 40

The target base station 401B is also configured to send 40, to the source base station 401A, a handover acknowledgement message comprising a result of the analyzing, as described in operation 38. The radio circuitry 410B is configured to send, to the source base station 401A, the handover acknowledgement message comprising a result of the analyzing.

According to some of the example embodiments, the result may comprise an admissibility for each bearer of the sub-set of bearers with respect to the handover procedure. The result may further comprise an indication to the source base station to keep associations with any bearer which is not admissible.

Example Operation 42

According to some of the example embodiments, the sub-set of bearers may be an empty sub-set (e.g., comprising zero identified bearers). In such example embodiments, the target base station 401B may be further configured to undergo 42 a synchronization procedure with the wireless terminal. The processing circuitry 420B may be configured to undergo the synchronization procedure with the wireless terminal. It should also be appreciated that, according to some of the example embodiments, the sub-set of bearers may comprise all the bearers associated with the wireless terminal, or user equipment.

Example Operation 43

According to some of the example embodiments, the target base station 401B may be configured to transition 43 to an anchor base station or an assisting base station upon the handover procedure. The processing circuitry 420B may be configured to transition the target base station 401B to an anchor base station or a assisting base station upon the handover procedure.

Example Operation 44

According to some of the example embodiments, the transitioning 43 may further comprise receiving 44, from the wireless terminal, an indication of a radio link failure over an anchor link. The radio circuitry 410B may be configured to receive, from the wireless terminal, the indication of a radio link failure over the anchor link.

Example Operation 45

According to some of the example embodiments, the transitioning 43 and the receiving 44 may further comprise transitioning 45 the target base station 401B to an anchor base station. The processing circuitry 420B may be configured to transition the target base station 401B to an anchor base station.

Example Operation 46

According to some of the example embodiments, the handover request may comprise a bearer based mobility history of the wireless terminal. In such example embodiments, the target base station 401B may be further configured to maintain 46 the bearer based mobility history of the wireless terminal. The processing circuitry 420B may be configured to maintain the bearer based mobility history of the wireless terminal.

Example Operation 48

According to some of the example embodiments, the target base station 401B may be configured to send 48, to a mobility management node (e.g., a MME, SGSN, or a S4-SGSN), a path switch request comprising an identity of the sub-set of bearers which were successfully handed over. The radio circuitry 410B General Statements It should be noted that although terminology from 3GPP LTE has been used herein to explain the example embodiments, this should not be seen as limiting the scope of the example embodiments to only the aforementioned system. Other wireless systems, comprising HSPA, WCDMA, WiMax, UMB, WiFi and GSM, may also benefit from the example embodiments disclosed herein. It should also be appreciated that the term bearer (pre-existing, primary or auxiliary) represents a Data Radio Bearer (DRB) and/or an EPS Radio Bearer.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a source base station in a wireless communications network, for providing a handover for a sub-set of bearers associated with a wireless terminal being served by the source base station, said sub-set of bearers being less than or equal to all bearers associated with the wireless terminal, the method comprising:
   determining a need for a handover procedure;
   selecting the sub-set of bearers associated with the wireless terminal; and
   sending, to a target base station, a handover request for the sub-set of bearers, wherein at least one bearer of the wireless terminal remains connected to the source base station;
wherein selecting the sub-bearers comprises analyzing predetermined rules for selecting the sub-set of bearers and selecting the sub-set of bearers based on the analyzing, said predetermined rules comprising any one or more of:
   selecting non-guaranteed bit rate bearers;
   selecting guaranteed bit rate bearers;
   selecting guaranteed bit rate bearers with a maximum bit rate above or below a threshold level;
   selecting guaranteed bit rate bearers with a guaranteed with rate above or below a threshold level; and
   selecting bearers with respect to a Quality of Service class identifier.

2. The method of claim 1, wherein said determining comprises receiving, from the target base station, a handover acknowledgement message, said handover acknowledgment message providing an indication of a failed full handover procedure involving all bearers associated with the wireless terminal, said handover acknowledgement message further comprising an identification of bearers which are able to be handed over, and wherein said selecting further comprises selecting the sub-set of bearers to be equal to bearers identified in the handover acknowledgement message.

3. The method of claim 1, wherein said determining comprises receiving, from the target base station, a target base station load status, wherein the need for the handover procedure is determined based on the target base station load status.

4. The method of claim 1, wherein the selecting comprises:
   configuring the wireless terminal with different measurement reporting configurations with respect to different sub-sets of bearers associated with the wireless terminal;
   receiving, from the wireless terminal, a measurement report provided as a result of at least one measurement reporting configuration; and
   selecting a sub-set of bearers based on a result of the received measurement report.

5. The method of claim 1, wherein the selecting comprises selecting the sub-set of bearers based on a maintained bearer-based mobility history of the wireless terminal.

6. The method of claim 1, wherein the selecting comprises selecting the sub-set of bearers based on any one or more of a threshold, triggering event, a radio signal level, a buffer level of a bearer, and a load situation at the source base station or the target base station or both.

7. The method of claim 1, wherein the wireless network comprises at least one macro and at least one pico, or another macro, node or cell in another carrier, or same carrier, frequency for high data rate boosting, wherein the selecting further comprises selecting high data rate bearers for a handover procedure towards the at least one pico, or the another macro, node or cell.

8. The method of claim 1, further comprising:
   receiving, from the target base station, an acknowledgment message with respect to the handover procedure for the sub-set of bearers, said acknowledgment message comprising a result of the handover procedure for each bearer of the sub-set of bearers; and
   maintaining an association with a bearer of the sub-set of bears if the result of the handover procedure is not successful for said bearer.

9. The method of claim 1, further comprising transitioning to an anchor or assisting base station upon completion of the handover procedure.

10. The method of claim 9, wherein the source base station is an assisting base station, and wherein said transitioning comprises:
    receiving, from the wireless terminal, an indication of a radio link failure over an anchor link; and
    transitioning the source base station to an anchor base station.

11. The method of claim 1, wherein the source and target base stations comprise an assisting-assisting pairing or an anchor-assisting pairing.

12. The method of claim 1, wherein the source and target base stations use different bidirectional modes of communication, wherein a bidirectional mode of communication is a Time Division Duplex (TDD) or a Frequency Division Duplex (FDD) mode of communication.

13. A source base station adapted for use in a wireless communications network and adapted to provide a handover for a sub-set of bearers associated with a wireless terminal being served by the source base station, said sub-set of bearers being less than or equal to all bearers associated with the wireless terminal, the source base station comprising:
processing circuitry configured to determine a need for a handover procedure;
the processing circuitry being further configured to select the sub-set of bearers associated with the wireless terminal; and
radio circuitry configured to send, to a target base station, a handover request for the sub-set of bearers, wherein at least one bearer of the wireless terminal remains connect to the source base station;
wherein the processing circuitry is further configured to analyze predetermined rules for selecting the sub-set of bearers, said predetermined rules comprising any one or more of:
selecting non-guaranteed bit rate bearers;
selecting guaranteed bit rate bearers;
selecting guaranteed bit rate bearers with a maximum bit rate above or below a threshold level;
selecting guaranteed bit rate bearers with a guaranteed with rate above or below a threshold level; and
selecting bearers with respect to a Quality of Service class identifier.

14. The source base station of claim 13, wherein the radio circuitry is further configured to receive, from the target base station, a handover acknowledgement message, said handover acknowledgment message providing an indication of a failed full handover procedure involving all bearers associated with the wireless terminal, said handover acknowledgement message further comprising an identification of bearers which are able to be handed over, wherein the processing circuitry is further configured to select the sub-set of bearers to be equal to bearers identified in the handover acknowledgement message.

15. The source base station of claim 13, wherein the radio circuitry is further configured to receive, from the target base station, a target base station load status, and the processing circuitry is configured to determine the need for the handover procedure based on the target base station load status.

16. The source base station of claim 13, wherein the processing circuitry is further configured to configure the wireless terminal with different measurement reporting configurations with respect to different sub-sets of bearers associated with the wireless terminal; and the radio circuitry is configured to receive, from the wireless terminal, a measurement report provided as a result of at least one measurement report configuration, and the processing circuitry is also configured to select a sub-set of bearers based on configuration result of the received measurement report.

17. The source base station of claim 13, wherein the processing circuitry is further configured to maintain a mobility history of the wireless terminal, wherein the sub-set of bearers are selected based on the bearer-based mobility history of the wireless terminal.

18. The source base station of claim 13, wherein the processing circuitry is further configured to select the sub-set of bearers based on any one or more of a threshold, triggering event, a radio signal level, a buffer level of a bearer, and a load situation at the source base station and/or the target base station.

19. The source base station of claim 13, wherein the wireless network comprises at least one macro and at least one pico, or another macro, cell in another carrier, or a same carrier, frequency for high data rate boosting, wherein the processing circuitry is further configured to select high data rate bearers for a handover procedure towards the at least one pico, or the another macro, node or cell.

20. The source base station of claim 13, wherein the radio circuitry is further configured to receive, from the target base station, an acknowledgment message with respect to the handover procedure for the sub-set of bearers, said acknowledgment message comprising a result of the handover procedure for each bearer of the sub-set of bearers; and the processing circuitry further configured to maintain an association with a bearer of the sub-set of bears if the result of the handover procedure is not successful for said bearer.

21. The source base station of any of claim 13, wherein the processing circuitry is further configured to transition the source base station to an anchor or assisting base station upon completion of the handover procedure.

22. The source base station of claim 21, wherein the source base station is an assisting base station, the radio circuitry is further configured to receive, from the wireless terminal, an indication of a radio link failure over an anchor link, and the processing circuitry is configured to transition the source base station to an anchor base station.

23. The source base station of claim 13, wherein the source and target base stations comprise an assisting-assisting pairing or an anchor-assisting pairing.

24. The source base station of claim 13, wherein the source and target base stations use different bidirectional modes of communication, wherein a bidirectional mode of communication is a Time Division Duplex (TDD) or a Frequency Division Duplex (FDD) mode of communication.

25. A method, in a target base station in a wireless communications network, for providing a handover for a sub-set of bearers associated with a wireless terminal being served by a source base station, said sub-set of bearers being less than or equal to all bearers associated with the wireless terminal, the method comprising:
receiving, from the source base station, a handover request for the sub-set of bearers, wherein at least one bearer of the wireless terminal is to remain connected to the source base station;
analyzing an admissibility of the sub-set of bearers with respect to the handover procedure;
sending, to the source base station, a handover acknowledgement message comprising a result of the analyzing; and
receiving, from the source base station, at least one subsequent handover request, wherein each subsequent handover request is treated as a handover request of only a sub-set of bearers associated with the wireless terminal.

26. The method of claim 25, wherein the result comprises an admissibility for each bearer of the sub-set of bearers with respect to the handover procedure, the result further comprising an indication to the source base station to keep associations with any bearer which is not admissible.

27. The method of claim 25, wherein the sub-set of bearers is an empty sub-set, the method further comprising undergoing a synchronization procedure with the wireless terminal.

28. The method of claim 25, further comprising transitioning to an anchor base station or an assisting base station upon the handover procedure.

29. The method of claim 28, wherein the target base station is an assisting base station, and wherein said transitioning comprises:
receiving, from the wireless terminal, an indication of a radio link failure over an anchor link; and
transitioning the target base station to an anchor base station.

30. The method of claim 25, wherein the handover request comprises a bearer-based mobility history of the wireless terminal, the method further comprising maintaining the bearer-based mobility history of the wireless terminal.

31. The method of claim 25, further comprising sending, to a mobility management node, a path switch request comprising an identity of the sub-set of bearers that were successfully handed over.

32. The method of claim 25, wherein the source and target base stations comprise an assisting-assisting pairing or an anchor-assisting pairing.

33. The method of claim 25, wherein the source and target base stations use different bidirectional modes of communication, wherein a bidirectional mode of communication is a Time Division Duplex (TDD) or a Frequency Division Duplex (FDD) mode of communication.

34. A target base station adapted for use in a wireless communications network and for providing a handover for a sub-set of bearers associated with a wireless terminal being served by a source base station, said sub-set of bearers being less than or equal to all bearers associated with the wireless terminal, the target base station comprising:
  radio circuitry configured to receive, from the source base station, a handover request for the sub-set of bearers, wherein at least one bearer of the wireless terminal remains connected to the source base station; and
  processing circuitry configured to analyze an admissibility of the sub-set of bearers with respect to the handover procedure;
  wherein the radio circuitry is further configured to send, to the source base station, a handover acknowledgement message comprising a result of the analyzed admissibility; and
  wherein the radio circuitry is further configured to receive, from the source base station, at least one subsequent handover request, wherein the processing circuitry is further configured to treat each subsequent handover request as a handover request for only a sub-set of bearers associated with the wireless terminal.

35. The target base station of claim 34, wherein the result comprises an admissibility for each bearer of the sub-set of bearers with respect to the handover procedure, the result further comprising an indication to the source base station to keep associations with any bearer that is not admissible.

36. The target base station of claim 34, wherein the sub-set of bearers is an empty sub-set, the processing circuitry further configured to undergo a synchronization procedure with the wireless terminal.

37. The target base station of claim 34, wherein the processing circuitry is further configured to transition to an anchor base station or an assisting base station upon the handover procedure.

38. The target base station of claim 37, wherein the target base station is an assisting base station, wherein the radio circuitry is further configured to receive, from the wireless terminal, an indication of a radio link failure over an anchor link, and wherein the processing circuitry is configured to transition the target base station to an anchor base station.

39. The target base station of claim 34, wherein the handover request comprises a bearer-based mobility history of the wireless terminal, and wherein the processing circuitry is further configured to maintain the bearer-based mobility history of the wireless terminal.

40. The target base station of claim 34, wherein the radio circuitry is further configured to send, to a mobility management node, a path switch request comprising an identity of the sub-set of bearers which were successfully handed over.

41. The target base station of claim 34, wherein the source and target base stations comprise an assisting-assisting pairing or an anchor-assisting pairing.

42. The target base station of claim 34, wherein the source and target base stations use different bidirectional modes of communication, wherein a bidirectional mode of communication is a Time Division Duplex (TDD) or a Frequency Division Duplex (FDD) mode of communication.

* * * * *

UNITED STATES PATENT AND TRADEMARK OFFICE
CERTIFICATE OF CORRECTION

PATENT NO. : 9,479,973 B2
APPLICATION NO. : 14/008936
DATED : October 25, 2016
INVENTOR(S) : Centonza et al.

Page 1 of 1

It is certified that error appears in the above-identified patent and that said Letters Patent is hereby corrected as shown below:

In the Specification

In Column 4, Line 8, delete "Symbol" and insert -- Signal --, therefor.

In Column 4, Line 38, delete "OAM" and insert -- O&M --, therefor.

In Column 7, Line 43, delete "51-AP" and insert -- S1-AP --, therefor.

In the Claims

In Column 32, Line 44, in Claim 8, delete "bears" and insert -- bearers --, therefor.

In Column 34, Line 8, in Claim 20, delete "bears" and insert -- bearers --, therefor.

In Column 34, Line 10, in Claim 21, delete "The source base station of any of claim" and insert -- The source base station of claim --, therefor.

Signed and Sealed this
Twenty-seventh Day of August, 2019

Andrei Iancu
*Director of the United States Patent and Trademark Office*